(12) United States Patent
Hosoi et al.

(10) Patent No.: US 7,783,581 B2
(45) Date of Patent: Aug. 24, 2010

(54) DATA LEARNING SYSTEM FOR IDENTIFYING, LEARNING APPARATUS, IDENTIFYING APPARATUS AND LEARNING METHOD

(75) Inventors: Toshinori Hosoi, Tokyo (JP); Atsushi Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 562 days.

(21) Appl. No.: 11/794,730

(22) PCT Filed: Dec. 26, 2005

(86) PCT No.: PCT/JP2005/023821
§ 371 (c)(1),
(2), (4) Date: Sep. 19, 2007

(87) PCT Pub. No.: WO2006/073081
PCT Pub. Date: Jul. 13, 2006

(65) Prior Publication Data
US 2008/0091627 A1  Apr. 17, 2008

(30) Foreign Application Priority Data
Jan. 5, 2005 (JP) .............................. 2005-001016

(51) Int. Cl.
*G06F 15/18* (2006.01)
(52) U.S. Cl. ....................................................... 706/12
(58) Field of Classification Search .................... 706/12
See application file for complete search history.

(56) References Cited

U.S. PATENT DOCUMENTS 5,214,715 A * 5/1993 Carpenter et al. ............ 382/157

(Continued)

FOREIGN PATENT DOCUMENTS

JP  1-321589  12/1989

(Continued)

OTHER PUBLICATIONS

A Query Expansion Algorithm Based on Phrases Semantic Similarity, Yongli Liu; Chao Li; Pin Zhang; Zhang Xiong; Information Processing (ISIP), 2008 International Symposiums on Digital Object Identifier: 10.1109/ISIP.2008.57 Publication Year: 2008, pp. 31-35.*

(Continued)

*Primary Examiner*—Michael Holmes
(74) *Attorney, Agent, or Firm*—Foley & Lardner LLP

(57) ABSTRACT

A discriminative data learning system provided comprises a learning device for updating dictionary data having a template to be used for discriminating the category of a hierarchical structure, and a discriminating device for classifying a pattern into a category with reference to the dictionary data. The learning device includes a learning data storage unit for storing the pattern and the category number of the category, to which the pattern belongs, a dictionary data storage unit for holding the template and the category number, to which the template belongs, a similarity calculating unit for calculating the similarity between the pattern and the template, an update calculating unit for calculating a first update for updating the template, on the basis of the similarity, a weighing unit for multiplying the first update by a weighing constant each determined separately for the hierarchy of the category, to determine a second update, and a dictionary updating unit for updating the template on the basis of the second update. The discriminating device includes a category determining unit for classifying the input pattern having the calculated similarity, into the same category as that of the template having a high similarity.

32 Claims, 19 Drawing Sheets

U.S. PATENT DOCUMENTS

| | | | |
|---|---|---|---|
| 5,315,689 A * | 5/1994 | Kanazawa et al. | 704/238 |
| 5,390,281 A * | 2/1995 | Luciw et al. | 706/11 |
| 5,434,777 A * | 7/1995 | Luciw | 704/9 |
| 5,479,570 A | 12/1995 | Imagawa et al. | |
| 5,608,624 A * | 3/1997 | Luciw | 715/210 |
| 5,617,483 A * | 4/1997 | Osawa | 382/159 |
| 5,630,022 A * | 5/1997 | Ono | 706/40 |
| 6,272,246 B1 * | 8/2001 | Takai | 382/209 |
| 6,757,362 B1 * | 6/2004 | Cooper et al. | 379/88.01 |
| 7,239,725 B2 * | 7/2007 | Dobashi | 382/118 |
| 7,370,019 B2 * | 5/2008 | Mattiussi et al. | 706/13 |
| 7,447,666 B2 * | 11/2008 | Wang | 706/45 |

FOREIGN PATENT DOCUMENTS

| | | |
|---|---|---|
| JP | 2779119 | 5/1998 |
| JP | 2000-076382 A | 3/2000 |
| JP | 2001-184509 A | 7/2001 |
| JP | 2002-334303 A | 11/2002 |
| JP | 2003-123023 A | 4/2003 |

OTHER PUBLICATIONS

Newly-born keyword extraction under limited knowledge resources based on sentence similarity verification, Kongachandra, R.; Kimpant, C.; Suwanapong, T.; Chamnongthai, K.; Communications and Information Technology, 2004. ISCIT 2004. IEEE International Symposium on vol. 2 Digital Object Identifier: 10.1109/ISCIT.2004.1413905.*

Sentence Similarity Measurement Based on Shallow Parsing, Lin Li; Yiming Zhou; Boqiu Yuan; Jun Wang; Xia Hu; Fuzzy Systems and Knowledge Discovery, 2009. FSKD '09. Sixth International Conference on vol. 7 Digital Object Identifier: 10.1109/FSKD.2009.657 Publication Year: 2009, pp. 487-491.*

The Researching on Similarity Calculation Based on HNC, Cheng Xian-yi; Sun Ping; Zhu Qian; MultiMedia and Information Technology, 2008. MMIT '08. International Conference on Digital Object Identifier: 10.1109/MMIT.2008.140 Publication Year: 2008, pp. 786-789.*

T. Kohonen et al., "Self-Organization and Associative Memory," 3$^{rd}$ Edition, 1989, pp. 1-12, Springer-Verlag.

A. Sato et al., "Character Recognition Using Generalized Learning Vector Quantization," IEICE Technical Report, PRMU95-219, 1996, pp. 23-30.

* cited by examiner

Fig. 2 RELATED ART

| DICTIONARY DATA | | | | | | | |
|---|---|---|---|---|---|---|---|
| MAIN DATA | | | | | | | |
| HIGHEST (FIRST) ORDER HIERARCHY | | SECOND ORDER HIERARCHY | | | LOWEST (N-TH) ORDER HIERARCHY | |
| TEMPLATE | CATEGORY NUMBER | TEMPLATE | CATEGORY NUMBER | | TEMPLATE | CATEGORY NUMBER |
| T1 | L1-1 | T8 | L2-1 | ... | T15 | LN-1 |
| T2 | L1-2 | T9 | L2-2 | | T16 | LN-2 |
| T3 | L1-3 | T10 | L2-3 | | T17 | LN-3 |
| T4 | L1-3 | T11 | L2-4 | | T18 | LN-4 |
| T5 | L1-4 | T12 | L2-5 | | T19 | LN-5 |
| T6 | L1-4 | T13 | L2-6 | | T20 | LN-6 |
| T7 | L1-5 | T14 | L2-7 | | T21 | LN-7 |

Fig. 6

| | | 21 |
|---|---|---|
| | 22 | 23 |

| DICTIONARY DATA | | | | |
|---|---|---|---|---|
| MAIN DATA | | HIERARCHY-SPECIFIC CATEGORY NUMBER CORRESPONDENCE TABLE | | |
| TEMPLATE | LOWEST (N-TH) ORDER HIERARCHY CATEGORY NUMBER | LOWEST ORDER HIERARCHY CATEGORY NUMBER | FIRST ORDER HIERARCHY CATEGORY NUMBER | (N-1)-TH ORDER HIERARCHY CATEGORY NUMBER |
| T1 | LN-1 | LN-1 | L1-1 | L(N-1)-1 |
| T2 | LN-2 | LN-2 | L1-2 | L(N-1)-2 |
| T3 | LN-3 | LN-3 | L1-3 | L(N-1)-3 |
| T4 | LN-3 | LN-4 | L1-3 | L(N-1)-3 |
| T5 | LN-4 | LN-5 | L1-4 | L(N-1)-4 |
| T6 | LN-4 | LN-6 | L1-4 | L(N-1)-5 |
| T7 | LN-5 | LN-7 | L1-5 | L(N-1)-6 |

Fig. 15
| TEMPLATE | | CATEGORY NUMBER OF FIRST ORDER HIERARCHY | CATEGORY NUMBER OF SECOND ORDER HIERARCHY |
|---|---|---|---|
| T1 |  | 1 | 1 |
| T2 |  | 1 | 1 |
| T3 |  | 2 | 2 |
| T4 |  | 2 | 2 |
| T5 |  | 2 | 3 |
| T6 |  | 2 | 3 |
| T7 |  | 2 | 4 |
| T8 |  | 2 | 4 |
Fig. 16
| LEARNING SAMPLE PATTERN | | ANSWER CATEGORY NUMBER OF FIRST ORDER HIERARCHY | ANSWER CATEGORY NUMBER OF SECOND ORDER HIERARCHY |
|---|---|---|---|
| x |  | 2 | 2 |

Fig. 17
| TEMPLATE | | CATEGORY NUMBER OF FIRST ORDER HIERARCHY | CATEGORY NUMBER OF SECOND ORDER HIERARCHY | SIMILARITY (0-1) TO LEARNING SAMPLE PATTERN x |
|---|---|---|---|---|
| T1 |  | 1 | 1 | 0.10 |
| T2 |  | 1 | 1 | 0.94 |
| T3 |  | 2 | 2 | 0.55 |
| T4 |  | 2 | 2 | 0.82 |
| T5 |  | 2 | 3 | 0.33 |
| T6 |  | 2 | 3 | 0.91 |
| T7 |  | 2 | 4 | 0.44 |
| T8 |  | 2 | 4 | 0.45 |

Fig. 18
| TEMPLATE | | CATEGORY NUMBER OF FIRST ORDER HIERARCHY | CATEGORY NUMBER OF SECOND ORDER HIERARCHY | SIMILARITY (0-1) TO LEARNING SAMPLE PATTERN x |
|---|---|---|---|---|
| T1 |  | 1 | 1 | 0.10 |
| T2 |  | 1 | 1 | 0.89 |
| T3 |  | 2 | 2 | 0.55 |
| T4 |  | 2 | 2 | 0.82 |
| T5 |  | 2 | 3 | 0.33 |
| T6 |  | 2 | 3 | 0.95 |
| T7 |  | 2 | 4 | 0.44 |
| T8 |  | 2 | 4 | 0.45 |

DATA LEARNING SYSTEM FOR IDENTIFYING, LEARNING APPARATUS, IDENTIFYING APPARATUS AND LEARNING METHOD

This application is a national stage of International Application No. PCT/JP2005/023821, which claims priority to Japanese Application No. 2005-001016, the respective disclosures of which are hereby incorporated by reference in their entireties.

TECHNICAL FIELD

The present invention relates to a data learning system for identifying, learning apparatus, identifying apparatus and learning method, and more particularly relates to a data learning system for identifying, learning apparatus, identifying apparatus and learning method which execute learning with respect to an identification of category of hierarchy.

BACKGROUND ART

A category is a term in a pattern recognition field and indicates a classification of patterns. This may be referred to as a class. In general term, this is referred to as a "kind" or "group". For example, when an image is identified as "face" or "not-face", the categories are two, "face" and "not-face". In the case of "child's face", "adult face", "old person's face" and "not-face", the number of categories is 4. The pattern indicates any data such as image, sound and character.

Hierarchical categories, namely categories having hierarchical structure, indicate categories having a hierarchical tree structure having one or more roots or categories regarded to have the same. A category near the root is referred to as high order. A category near a leaf of the tree is referred to as low order. FIG. 1 is a tree diagram showing an example of the hierarchical categories according to conventional art. The figure shows the tree structure having three kinds, "hand", "face" and "other", of root.

Japanese Laid Open Patent Application (JP-P 2000-76382A) discloses one example of learning method for identifying hierarchical category. Dictionaries according to the method are hierarchical dictionaries consisting of low order dictionaries of detailed classification and high order dictionaries of classification. The dictionaries of detailed classification are constructed by using a learning database. The high order dictionaries of classification consist of templates classified based on the features of templates of the low order dictionaries of detailed classification. By the way, the template is a pattern to be referred in identification. As a synonym, there is a term of reference vector. FIG. 2 shows a configuration of dictionary data according to conventional art. The learning method having such configuration of dictionary has a problem that the number of the templates is large. The dictionary has templates of all hierarchies from template of high order hierarchy to template of low order hierarchy, separately.

On the other hand, as a learning method of the dictionary configuration in which templates of high order hierarchy and template of low order hierarchy are not separated, for example, the following method is easily considered. That is, templates corresponding to the lowest order hierarchy are prepared by learning while disregarding the hierarchical structure. In the method, conventional template preparing procedures which do not take hierarchical categories as targets, such as LVQ (Learning Vector Quantization), are used. However, there is another problem that the dictionary of templates prepared by the method can identify categories of the lowest order hierarchy but can not necessarily identify categories of high order hierarchy correctly. The reason will be described bellow.

FIG. 3A and FIG. 3B are schematic diagrams showing conventional learning method for the dictionary configuration in which templates of high order hierarchy and templates of low order hierarchy are not separated. Examples in the case that LVQ2 is used for updating the templates are shown. A learning rule of LVQ2 is improved than that of LVQ1. A circle symbol represents a template (first order hierarchy category number 1, second order hierarchy category number 1). A rectangle symbol represents a template (first order hierarchy category number 1, second order hierarchy category number 2). A triangle symbol represents a template (first order hierarchy category number 2, second order hierarchy category number 3). A diamond symbol represents a learning sample pattern (first order hierarchy category number 1, second order hierarchy category number 1). A vector (arrow) represents a direction and magnitude of template updating. A line represents a boundary between categories. FIG. 3A shows the case that templates are updated based on the categories of the lowest order hierarchy. FIG. 3B shows the case that templates are updated based on the categories other than the categories of the lowest order hierarchy.

The reason why the categories of the high order hierarchy can not necessarily be identified correctly although the categories of the lowest order hierarchy can be identified is that the learning based on the categories of the lowest order hierarchy may be not appropriate for classifying categories based on the high order hierarchy in some case. As shown in FIG. 3A and FIG. 3B, a template close to the learning sample pattern is selected from each of answer category and rival category and each of the selected templates is updated. The template close to the learning sample has high similarity to the learning sample pattern. The sample pattern means a pattern extracted from a parent population for same purpose. In general learning method, a large number of patterns are prepared for the learning. Such pattern used for learning is referred to as learning sample pattern or training pattern. A category to which the learning sample pattern belongs is referred to as answer category or teacher data. A category to which the template belongs is not referred to as answer category. A category number assigned to the answer category is referred to as answer category number. In an actual program, one number is assigned to one category. FIG. 3A shows an example of update of templates. The update is appropriate for the categories of the lowest order hierarchy but is not appropriate for the categories of the high order hierarchy. On the other hand, FIG. 3B shows an example in which an appropriate update of templates is executed for the category of the high order hierarchy.

As related art, Japanese Laid Open Patent Application (JP-P 2002-334303A) discloses a character identifying apparatus. The character identifying apparatus is equipped with a standard pattern dictionary which includes standard patterns each of which represents a feature of character. The character identifying apparatus identifies a character pattern as a target of identification based on the comparison between the character pattern and the standard patterns. Moreover, character statistic information of record is prepared, the character is weighted based on the character statistic information and the result of the character identification is outputted. At this time, the result of identification is obtained based on the result of comparison between the feature of the character pattern and standard patterns and a weight used for the weighting. The result of identification is outputted.

As another related art, Japanese Laid Open Patent Application (JP-P 2001-184509A) discloses a pattern identifying apparatus. The pattern identifying apparatus extracts an m dimension reference patterns and an m dimension feature from an n (m<n) dimension reference patterns in a dictionary for detailed identification and an n dimension feature extracted from a learning pattern, based on a current feature selection dictionary. After that, the reference pattern closest to the m dimension feature is extracted as a reference pattern A from the m dimension reference patterns belonging to the same category as the learning pattern belongs. The reference pattern closest to the m dimension feature is extracted as a reference pattern B from them dimension reference patterns belonging to another category different from the category to which the learning pattern belongs. The feature selection dictionary is updated such that the distance between the m dimension feature and the reference pattern A becomes shorter and that the distance between the m dimension feature and the reference pattern B becomes longer.

Moreover, as another related art, Japanese Patent Publication No. 2779119 discloses a learning identifying apparatus. The learning identifying apparatus is provided with a means for calculating for a plurality of category groups. The means for calculating calculates a group membership degree as degree of belonging of an input pattern signal to the category group of which a major classification section is composed of a set of similar patterns. An in-group similarity calculating section calculates an in-group similarity as a degree of belonging of the input pattern signal to a category in each category group. A plurality of multipliers calculate the products of the in-group similarities and the group membership degrees. An identification signal weighting section weights the in-group similarities. A category identifying section compares the weighted in-group similarity signals. Moreover, a teacher signal necessary for learning is generated, and an amount of weight change of the in-group similarity calculation section is controlled based on the teacher signal, an output from the identification signal weighting section and an output from the category identifying section. The plurality of multipliers calculate the product of a learning control signal outputted from the learning controller section and the group membership degree outputted from the major classification section. The learning control signal is weighted, and a weight coefficient of the in-group similarity calculating section is updated based on an output from the identification signal weighting section and an output from the in-group similarity calculating section.

As another related art, Japanese Laid Open Patent Application (JP-P 2003-123023A) discloses a character identifying method. This character identifying method includes: a step for obtaining an optimum binarization threshold for a input gray scale image by inputting a gray scale distribution of the input gray scale image, referring to examples of gray scale distribution in an estimation table provided in advance, selecting a gray scale distribution which is most similar to the gray scale distribution of the input gray scale image, obtaining an initial threshold for the input gray scale image, and adding a threshold difference value accompanying the gray scale distribution to the initial threshold; a step for binarizing the input gray scale image based on the optimum binarization threshold; a step for cutting out a character region from the binarized image; a step for calculating a similarity between the character region and each template of a template dictionary provided in advance; and a step for determining a character of a category of a template of the highest similarity among the similarities as a identification result.

Learning methods such as the above conventional art can be applied to an identifying apparatus for identifying data pattern such as character and image. The identifying apparatus means the apparatus which outputs a category as an identification result based on an input of a pattern. The identifying apparatus is often implemented as a program or a function in a program. FIG. 4 is a block diagram of a typical identifying apparatus, namely, a system for identifying pattern. In FIG. 4, a preprocessing and feature extracting section 10 preprocesses an input pattern, extracts a feature thereof and converts it into a feature pattern. An identification section 20 identifies a category to which the feature pattern belongs, obtains a category label and outputs it as an identification result from the system. As a method of feature extraction, for example, in the case of an image pattern, a conventional feature extracting method can be used which is disclosed in Japanese Laid Open Patent Application (JP-A-Heisei, 01-321589).

The category label is a value defined in the program and is assigned to each category. For example, when the images of a human and a monkey are given as the input patterns, "0" is assigned to the human image and "1" is assigned to the monkey image. The category label is not required to be a numeral. For example, a character string of "human" may be returned for the human image and a character string of "monkey" may be returned for the monkey image. The category labels are only required to distinguish the categories.

Conventionally, an identifying method based on a pattern representing a category is known as a method of identifying pattern corresponding to the identification section 20 in FIG. 4. Such a pattern is referred to as a template, a representative vector, a reference vector or a prototype. Each category may have one template or a plurality of templates. Generally, the template is a pattern having the same data format as the input pattern after the feature extraction.

When the feature pattern in FIG. 4 is identified, the similarities between the feature pattern and the templates are evaluated by using a certain scale, and the feature pattern is identified that it belongs to the category to which the template of the highest similarity belongs. The similarity means a degree indicating the resemblance between a pattern and another pattern. As the simplest example, a correlation value or a Euclidean distance is used to calculate it. The scale of similarity is only required to evaluate the resemblance. For example, there are: a method in which the feature pattern and template are regarded as vectors, a Euclidean distance between the two vectors is calculated and the similarity is determined to be higher as the distance is shorter; and a method in which the inner product of the two vectors is calculated and the similarity is determined to be higher as the angle between the two vectors is smaller.

As a method in which the category is determined based on the similarity between the feature pattern and each of plurality of templates, there is another method different from the method in which the feature pattern is classified to the category to which the template of the highest similarity belongs. For example, there is a method in which number k of templates of high similarity are obtained, a majority operation is carried out for the category labels to which the number k of templates belong and the feature pattern is classified to the category of the largest number.

As a template preparing method for the above mentioned identifying method in which the identification is carried out based on the similarities between the feature pattern and templates, namely, as a conventional method known as learning method of templates, there are: "method in which average of learning sample patterns is simply obtained", "K-means method", "LVQ2.1 (leaning vector quantization 2.1)" (T.

Kohonen, Self-Organization and Associative Memory, Springer-Verlag, 1989), and "Generalized LVQ (generalized leaning vector quantization)" (SATO Atsushi, Character Recognition using Generalized Learning Vector Quantization, IEICE (The Institute of Electronics, Information and Communication Engineers) technical report). "Method in which average of learning sample patterns is simply obtained" is a method in which an average pattern of learning sample patterns belonging to one category is used as a template and in which one template is prepared for one category. "K-means method" is a method in which learning sample patterns belonging to one category are separated in a plurality of sets and in which an average pattern of the learning sample patterns in each set is used as a template. In "K-means method", based on the similarity between the template and sample pattern at a step, away of separation of the sample patterns is changed in the next step and then the templates are updated twice or more. One or more templates are prepared for each category by applying K-means method to the learning sample patterns belonging to each category. In "LVQ2.1", a Euclidean distance between each template prepared in some method and a learning sample pattern is obtained, the templates are updated such that the template of shortest distance among templates belonging to the same category as the answer category of the learning sample pattern is moved near the learning sample pattern and the template of shortest distance among templates belonging to the different category to the answer category of the learning sample pattern is moved away from the learning sample pattern. "Generalized LVQ" is a method including the procedures of "LVQ2.1". In "Generalized LVQ", the convergence of the update of templates is assured.

In the conventional art, there is a first problem that a size of dictionary of templates for identifying hierarchical categories is large. The reason is that the templates are possessed for each category of each hierarchy from high order hierarchy to low order hierarchy. When the template is prepared by using the conventional learning method based on the categories of the lowest order hierarchy, there is a second problem that a good performance is not assured for the category of high order hierarchy. The reason is that the learning based on the categories of the lowest order hierarchy is not appropriate for classification of the categories based on the high order hierarchy in some case. The conventional art has one of the two problems above mentioned.

DISCLOSURE OF INVENTION

An object of the present invention is to provide a data learning system for identifying, learning apparatus, identifying apparatus and learning method in which in the case of preparing templates for identifying hierarchical categories of tree structure having a plurality of roots, the templates is used which can reduce a size of dictionary data and enhance performance to identify a category of a hierarchy other than the lowest order hierarchy.

The object, other objects and benefits of the present invention will be easily understood from following descriptions and attached drawings.

In order to solve the above problem, a data learning system for identifying according to the present invention includes: a learning apparatus configured to update a dictionary data including templates to be used to identify a category of hierarchical structure; and an identifying apparatus configured to classify a pattern into a category by referring to the dictionary data. The learning apparatus includes: a learning data storage section configured to hold a pattern and category numbers of categories to which the pattern belongs; a dictionary data storage section configured to hold the templates and category numbers of categories to which the templates belong; a similarity calculating section configured to calculate similarities between the pattern and the templates; an update calculating section configured to calculate a first update for updating the templates based on the similarities; a weighting section configured to multiply the first update by a weight constant determined for each hierarchy of category to provide a second update; and a dictionary updating section configured to update the templates based on the second update. The identifying apparatus includes a category determining section configured to classify an input pattern after calculation of the similarities into a category to which one of the templates belongs. The template has a high similarity to the input pattern after calculation.

In the above data learning system for identifying, the learning apparatus further includes a feature extracting section configured to convert the pattern and input pattern into feature patterns and to send them to the similarity calculating section.

In order to solve the above problem, a learning apparatus according to the present invention is provided which prepares templates to be used to identify a category of hierarchical structure. The learning apparatus includes: a learning data storage section configured to hold a pattern and category numbers of categories to which the pattern belongs; a dictionary data storage section configured to hold the templates and category numbers of categories to which the templates belong; a similarity calculating section configured to calculate similarities between the pattern and the templates by referring to the learning data storage section and dictionary data storage section; an update calculating section configured to calculate a first update for updating the templates based on the similarities; a weighting section configured to multiply the first update by a weight constant determined for each hierarchy of category to provide a second update; a dictionary updating section configured to update the templates based on the second update.

In the above learning apparatus, the dictionary data storage section holds a main data in which each of the templates and a category number of a category of one hierarchy are correlated.

In the above learning apparatus, the dictionary data storage section further holds a correspondence table in which the category number of the category in the one hierarchy and a category number of a category of another hierarchy are correlated.

In the above learning apparatus, the dictionary data storage section holds a main data in which each of the templates and a category number of each category are correlated.

A learning apparatus according to the present invention includes: a similarity calculating section configured to calculate similarities between an input pattern and templates to be used to identify a category of hierarchical structure; an update calculating section configured to calculate a first update for updating the templates based on the similarities; a weighting section configured to weight the first update by using a weight constant determined for each hierarchy to provide a second update; a dictionary updating section configured to update the templates based on the second update.

The above learning apparatus further includes a feature extracting section configured to convert the input pattern into a feature pattern and to send it to the similarity calculating section.

In order to solve the above problem, a learning method according to the present invention is provided which prepares templates to be used to identify a category of hierarchical structure. The learning method includes: a step for calculating similarities between the templates and an input pattern; a step for calculating an update for changing the templates based on the similarities; a step for weighting the update by using a weight constant determined for each hierarchy; and a step for updating the templates based on the weighted update.

The above learning method is repeated for each of all categories to which the templates belong.

The above learning method is repeated for each of the input pattern.

The above learning method is repeated for a determined learning number.

The above learning method further includes a step for converting the input pattern into a feature pattern at first.

As for the above learning method, in the step for calculating the similarities, a main data is referred in which each of the templates and a category number of a category of one hierarchy are correlated.

As for the above learning method, in the step of calculating the similarities, a correspondence table is referred in which the category number of the category in the one hierarchy and a category number of another category hierarchy are correlated.

As for the above learning method, in the step for calculating the similarities, a main data is referred in which each of said templates and a category number of each category are correlated.

In order to solve the above problem, a computer program product according to the present invention includes a program coding means for executing all steps in any one of the above paragraphs when the product is used on a computer.

In order to solve the above problem, a computer readable recording media according to the present invention records a dictionary data which includes: a main data which correlates a template to be used for identifying a category of hierarchical structure and a category number of a category of one hierarchy; a correspondence table which correlate the category number of the category of the one hierarchy and a category number of a category of another hierarchy.

In order to solve the above problem, a computer readable recording media according to the present invention records a dictionary data which includes a main data which correlate a template to be used for identifying a category of hierarchical structure and a category number of each category.

In order to solve the above problem, an identifying apparatus according to the present invention includes: a dictionary data storage section configured to hold templates which are updated by the learning apparatus in any one of the above paragraphs and category numbers of categories to which the templates belong; and a similarity calculating section configured to calculate similarities between an input pattern and the templates; a category determining section configured to classify an input pattern after calculation of the similarities into a category to which one of the templates belongs. The template has the heist similarity to the input pattern after calculation.

In order to solve the above problem, an identifying method according to the present invention includes: a step for calculating similarities between an input pattern and templates updated by using the learning method in any one of the above paragraphs; and a step for classifying an input patter after the step for calculating the similarities into a category to which one of the templates belongs. The template has the highest similarity to the input pattern after the step for calculation.

In order to solve the above problem, a computer program product according to the present invention includes a program coding means for executing the all steps in claim 21 when the product is used on a computer.

BRIEF DESCRIPTION OF DRAWINGS

FIG. 2 shows a configuration of a dictionary data according to conventional art;

FIG. 6 shows a configuration of a dictionary data stored in a dictionary data storage section;

FIG. 15 shows an example of dictionary data stored in a dictionary data storage section;

FIG. 16 shows an example of learning sample pattern read from learning data storage section 101;

FIG. 17 shows an example of relation between the dictionary data and the learning sample pattern;

FIG. 18 shows an example of relation between the dictionary data and the learning sample pattern;

BEST MODE FOR CARRYING OUT THE INVENTION

A data learning system for identifying, learning apparatus, identifying apparatus and learning method according to embodiments of the present invention will be described below with reference to the attached drawings.

First Embodiment

A configuration of a learning apparatus according to a first embodiment of the present invention will be described.

Figure 5:
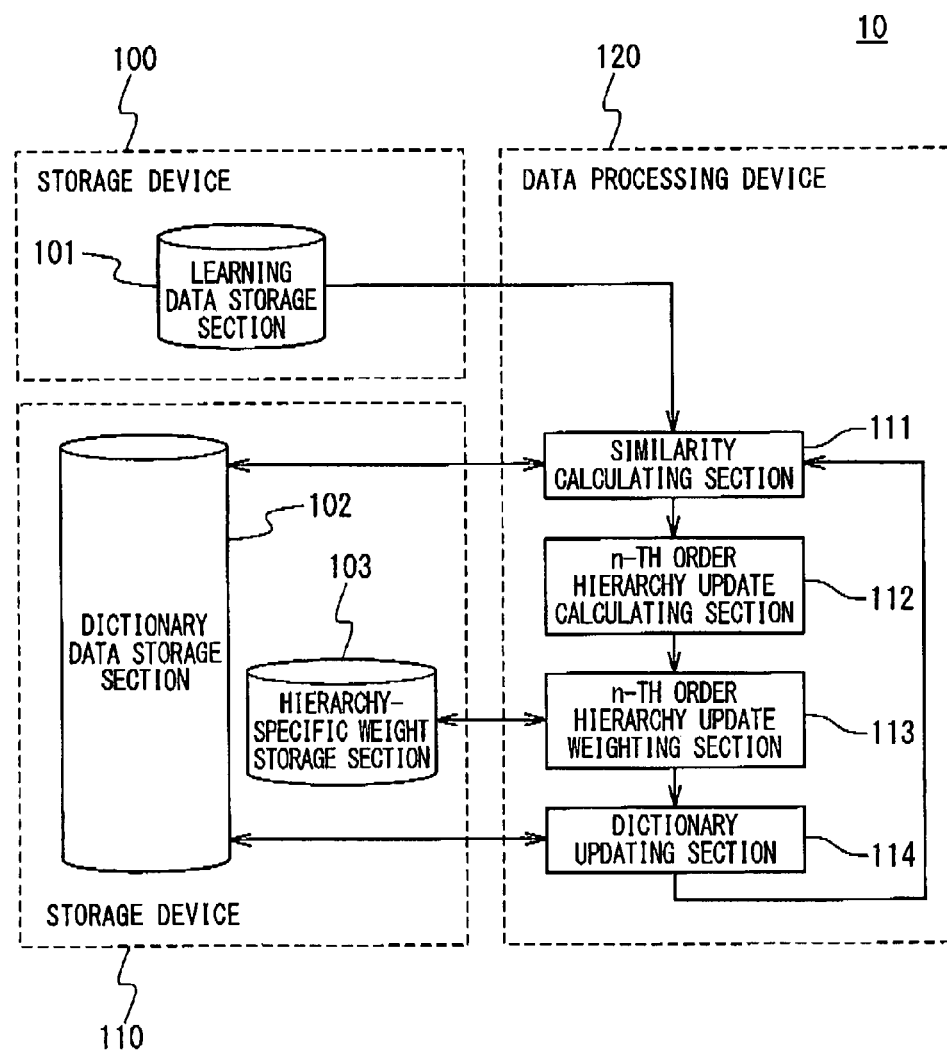
FIG. 5 is a block diagram showing a learning apparatus according to a first embodiment of the present invention.

FIG. 5 is a block diagram showing the configuration of the learning apparatus according to the first embodiment. The learning apparatus 10 includes a storage device 100, a storage device 110 and a data processing device 120. The storage device 100 includes a learning data storage section 101 for recording data. The storage device 110 includes a dictionary data storage section 102 and a hierarchy-specific weight storage section 103 each of which records data. The data processing device 120 includes a similarity calculating section 111, n-th order hierarchy update calculating section 112, n-th order hierarchy weighting section 113 and dictionary updating section 114, each of which is implemented as hardware, software or the combination of them.

The storage device 100 and storage device 110 may be implemented as the same storage device. For example, a magnetic disc device can be used as the storage device 100, a personal computer can be used as the data processing device 120, and a semiconductor memory can be used as the storage device 110. However, actually, they are not limited to the above-described examples.

The learning data storage section 101 stores learning sample patterns and their answer category numbers from the highest order hierarchy to the lowest order hierarchy. The dictionary data storage section 102 stores templates and answer category numbers, which correspond to the templates, from the highest order hierarchy to the lowest order hierarchy. The hierarchy-specific weight storage section 103 stores a constant defined for each of hierarchies of hierarchical categories.

FIG. 6 shows a configuration of dictionary data stored in the dictionary data storage section 102. The dictionary data 21 includes a main data 22 and a hierarchy-specific category number correspondence table 23. The main data 22 correlates each template to a lowest (N-th: N is a natural number) order hierarchy category number. The hierarchy-specific category number correspondence table 23 correlates each lowest hierarchy category number to category numbers of other hierarchies (from first order to (N-1)-th order).

Figure 1:
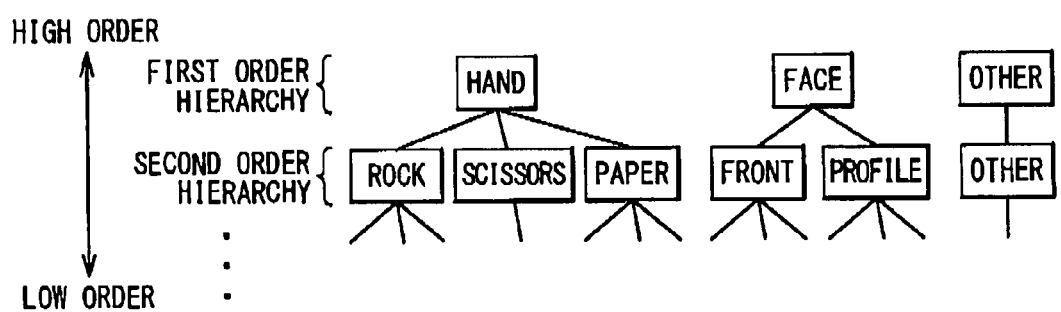
FIG. 1 is a tree diagram showing one example of hierarchical categories according to conventional art.
Figure 3A:
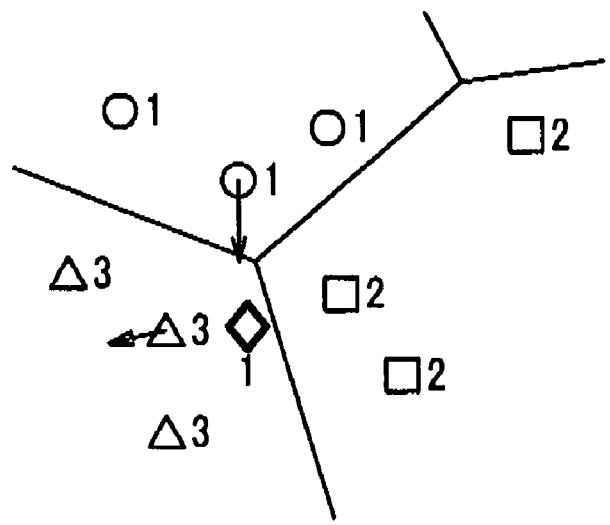
FIG. 3A is a schematic diagram for an explanation of a conventional learning method in which a configuration of dictionary does not separate a template of high order hierarchy and a template of low order hierarchy.
Figure 3B:
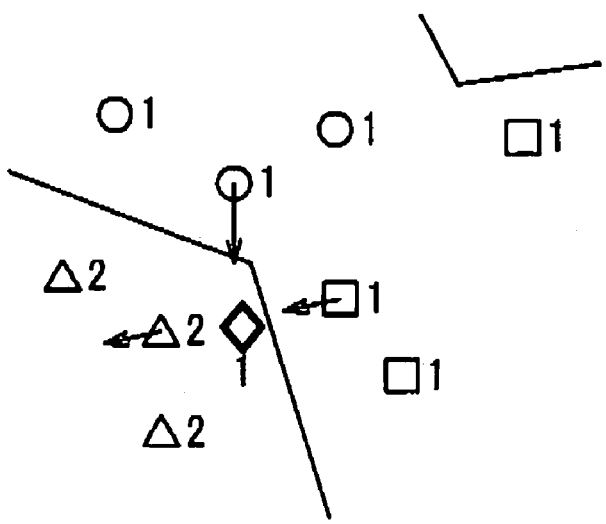
FIG. 3B is a schematic diagram for an explanation of a conventional learning method in which a configuration of dictionary does not separate a template of high order hierarchy and a template of low order hierarchy.

With reference to FIG. 5, the similarity calculating section 111 calculates a similarity between an inputted learning pattern and each template. An n-th order hierarchy update calculating section 112 calculates: an update to be added to a template of the answer category in a hierarchy (n-th order hierarchy: $1 \leq n \leq N$) to increase the similarity for the template; and an update to be added to a template of the rival category in the n-th order hierarchy to reduce the similarity for the template. The n-th order hierarchy weighting section 113 multiplies the update by one of the constants, which corresponds to the n-th order hierarchy, and the hierarchy-specific weight storage section 103 stores the result. The dictionary updating section 114 updates the templates of the answer and rival categories in the dictionary data storage section 102 based on the updates. For example, the template and the update are regarded as vectors, and as shown in FIG. 3, the vector as the update is added to the vector as the template to update the template.

Relations in magnitude among the weight constants stored in the hierarchy-specific weight storage section 103 will be described.

In the following equations, the weight constant of n-th order hierarchy is designated as wn.

At first, the next equation shows the relations, as an example, in which the weight constant of first order hierarchy is the largest and the weight constant of higher order hierarchy is equal or larger than the weight constant of lower order hierarchy.

$$w1 \geq w2 \geq \cdots \geq w(n-1) \geq wn \geq w(n+1) \geq \cdots \geq w(N-1) \geq wN$$

The next equation shows the relations, as another example, in which the weight constant of specific hierarchy, for example n-th order hierarchy, is the largest.

$$w1 \leq w2 \leq \cdots \leq w(n-1) \leq wn \geq w(n+1) \geq \cdots \geq w(N-1) \geq wN$$

However, the above equations indicate examples for the explanation, and the relations are not limited to the above equations.

The above sections operate as follows.

The similarity calculating section 111, the n-th order hierarchy update calculating section 112, the n-th order hierarchy weighting section 113 and the dictionary updating section 114, with regard to the learning sample patterns recorded in the learning data storage section 101 and the templates recorded in the dictionary data storage section 102, repeatedly execute the respective operations for all of the hierarchies, further repeatedly execute the repeated execution for all of the learning sample patterns and further repeatedly execute the repeated execution of the repeated execution for a determined learning number.

Next, the entire operation (a learning method according to the first embodiment) of the learning apparatus according to the first embodiment of the present invention will be described.

Figure 7:
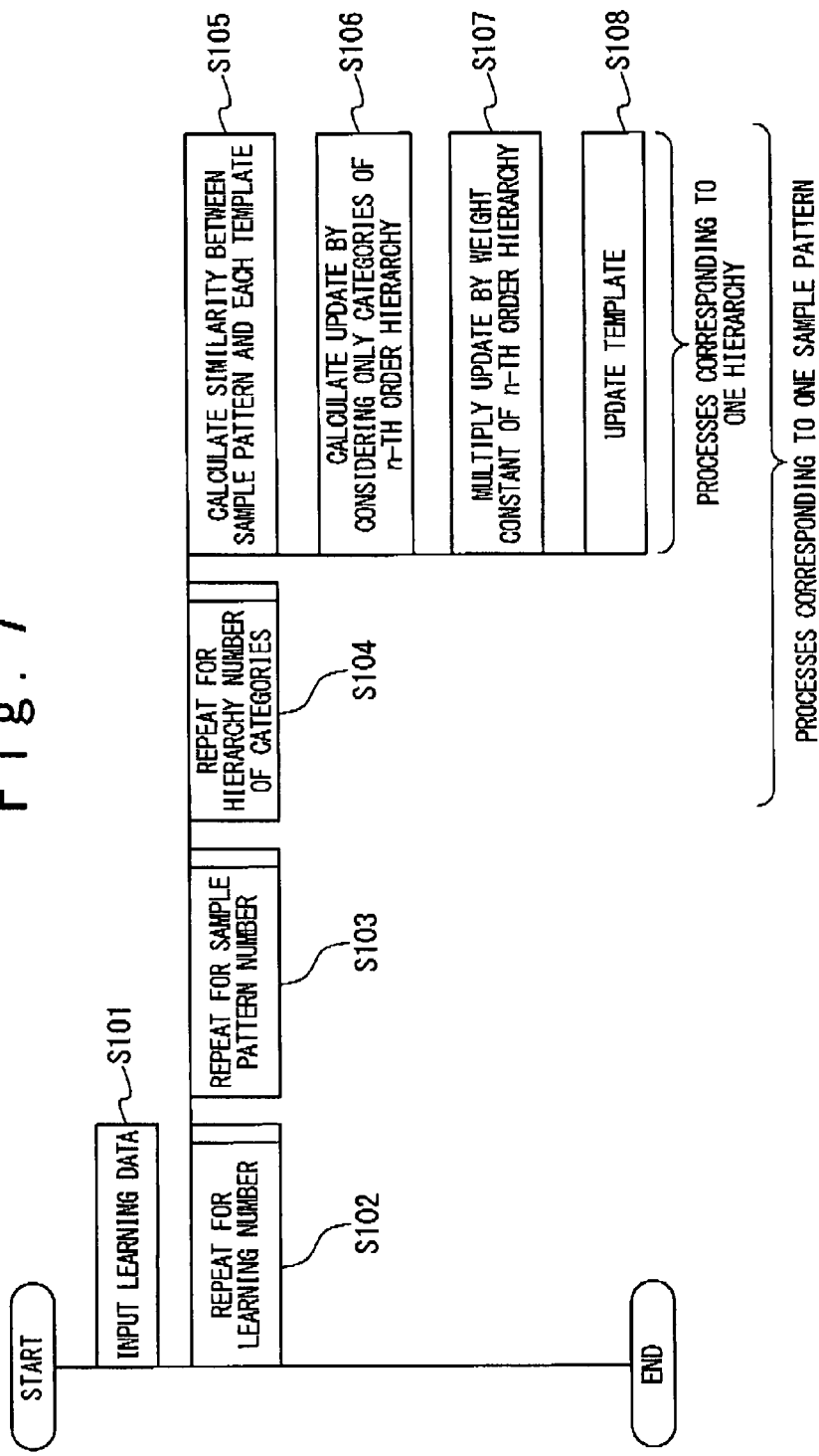
FIG. 7 is a PAD showing an entire operation of the learning apparatus according to the first embodiment of the present invention.

FIG. 7 is a PAD (Problem Analysis Diagram) showing the entire operation (the learning method according to the first embodiment) of the learning apparatus according to the first embodiment of the present invention.

At first, the learning sample patterns and answer category numbers thereof are inputted as learning data to the data processing device 120 from the learning data storage section 101 (Step S101). Next, the triple repeated processes of steps S102, S103 and S104 are executed. Before the explanations for the triple repeated processes, the processes (steps S105, S106, S107 and S108) in the repetition will be described.

At first, the similarity calculating section 111 calculates a similarity between the inputted learning sample pattern and each template in the dictionary data storage section 102 (Step S105). When the LVQ (Learning Vector Quantization) is used to update the templates, the template of obviously low similarity can be neglected in calculation of the updates for the templates. Therefore, in the course of the calculation of the similarity in the step S105, the calculation of the similarity for the template of obviously low similarity is stopped in some case.

Next, the n-th order hierarchy update calculating section 112 calculates the update for the template of the answer category and the update for the template of the rival category, by considering only the categories of n-th order hierarchy (Step S106). In the step S106, the update for the template can be obtained by the use of conventional template updating methods, such as LVQ, in which the hierarchical categories are not considered. In the LVQ, an association weight vector is updated to execute a pattern classification of the input data by competitive learning.

Next, the n-th order hierarchy update weighting section 113 calculates values as new updates by multiplying the updates for the answer category and for the rival category, which are obtained in step S106, by the weight constant in the hierarchy-specific weight storage section 103 (Step S107). The weight constant corresponds to n-th order hierarchy. Finally, the dictionary updating section 114 updates the templates of the answer category and of the rival category in the dictionary data storage section 102 (Step S108).

The processes of the steps S105, S106, S107 and S108 as mentioned above are executed for each hierarchy of the categories. Those steps S105 to S108 are repeated for the number of the hierarchies of the categories (Step S104). Moreover, the steps S104, S105, S106, S107 and S108 are the processes that are executed for each learning sample pattern, and are repeated for the number of the learning sample patterns (Step S103). Moreover, the steps S103, S104, S105, S106, S107 and S108 are repeated for the determined number of learning (Step S102).

Figure 8:
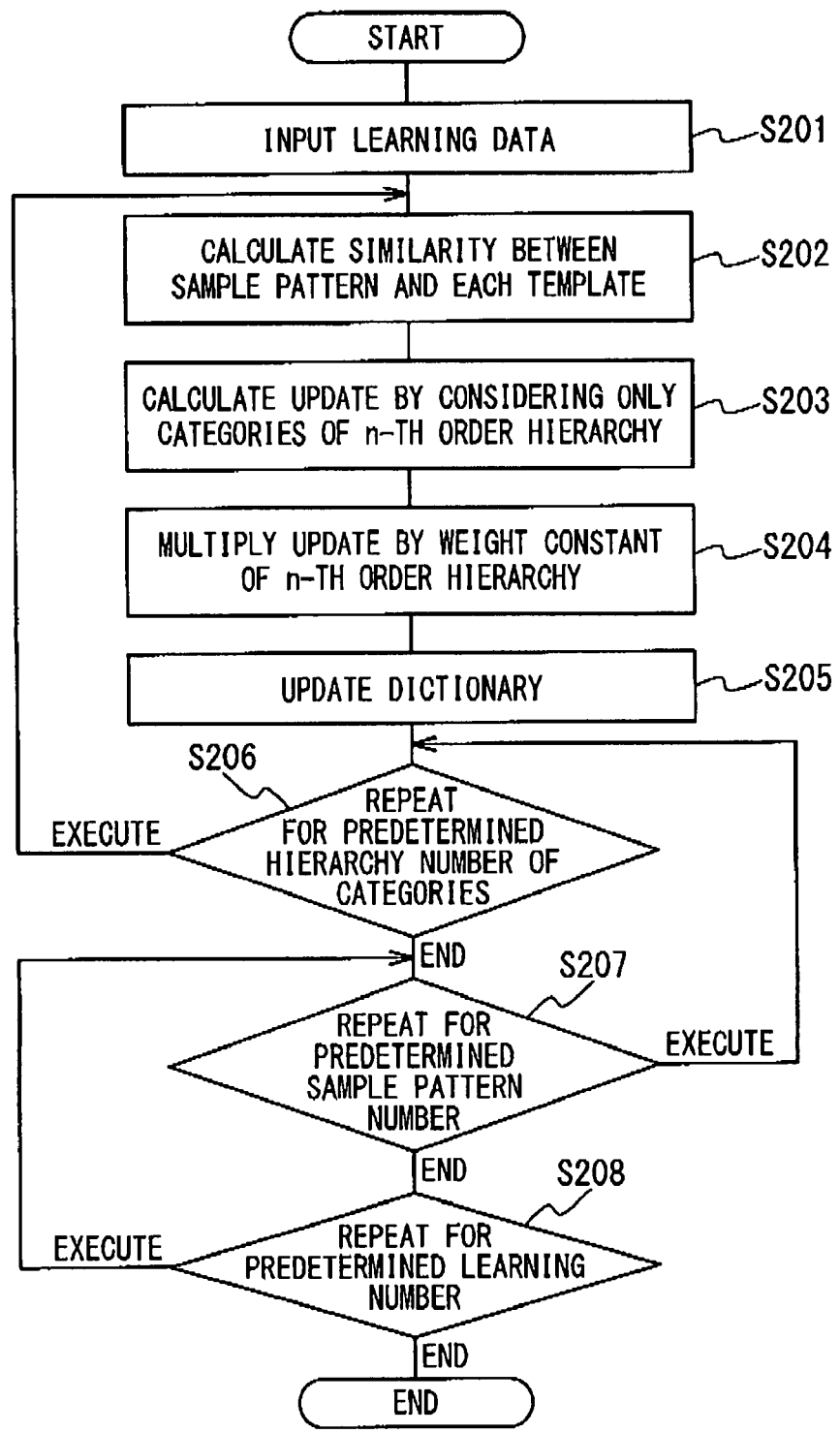
FIG. 8 is a flowchart showing the entire operation of the learning apparatus according to the first embodiment of the present invention.

FIG. 8 is a flowchart showing the entire operation (the learning method according to the first embodiment) of the learning apparatus according to the first embodiment of the present invention. In the figure, the PAD of FIG. 7 is represented as a flowchart.

The relation between FIG. 7 and FIG. 8 will be described. A step S201 in FIG. 8 corresponds to the step S101 in FIG. 7. Steps S202 to S205 correspond to the steps S105 to S108, respectively. Moreover, a step S206 that is a judging process for the repetition corresponds to the step S104, a step S207 corresponds to the step S103, and a step S208 corresponds to the step S102. The details of the operation are the same as shown in FIG. 7.

The entire operation according to the present embodiment will be described below with reference to the flowchart of FIG. 8.

The learning sample patterns and answer category numbers thereof are inputted as a learning data to the data processing device 120 from the learning data storage section 101 (Step S201). The similarity between the inputted learning sample pattern and each template in the dictionary data storage section 102 is calculated (Step S202). By considering only the categories of the n-th order hierarchy, the update for the template of the answer category and the update for the template of the rival category are calculated (Step S203). In the step S203, the updates are preferably calculated by the use of the conventional method for updating templates, in which hierarchical structure of categories is not considered. The conventional method is represented by LVQ. Next, the update for the answer category and the update for the rival category, which are obtained in step S203, are multiplied by the weight constant in the hierarchy-specific weight storage section 103, which corresponds to the n-th order hierarchy, to provide values as new updates (Step S204). Next, the template of the answer category and the template of the rival category, which are in the dictionary data storage section 102, are updated based on the updates obtained in the step S204 (Step S205). The processes of the steps S202, S203, S204 and S205 as mentioned above are executed for each hierarchy of the categories, and are repeated for the number of the hierarchies of the categories (Step S206). Moreover, the steps S206, S202, S203, S204 and S205 are the processes that are executed for each learning sample pattern, and are repeated for the number of the learning sample patterns (Step S207). The destination of return may be the front of the step S206 or the front of the step S202. Moreover, the steps S207, S206, S202, S203, S204 and S205 are repeated for the determined number of learning (Step S208). The destination of return may be the front of the step S207 or the front of the step S202.

The above operation according to the present embodiment can be executed by using a program or function of hardware installed in the apparatus according to the preset invention. For example, when the present invention is embodied on a personal computer, the CPU can execute an application program for executing the above operation.

In the present invention, the size of the dictionary for identifying can be small, since the dictionary data includes only the templates corresponding to the lowest order hierarchy of the hierarchical structure.

Moreover, according to the present invention, the performance of identification in arbitral hierarchy can be adjusted, since, with regard to each of the all hierarchies, the update for the template is multiplied by the weight constant corresponding to the hierarchy to update the template.

Moreover, when an object is detected from an image and a position of the object is estimated at the same time while a memory capacity for storing the dictionary data is suppressed to a small capacity, the present invention can be applied for the purpose of taking the detection of the object more important. For example, when a human is detected from an image from a monitoring camera and an orientation of the human is estimated at the same time, the present invention can be applied for the purpose of taking the detection of the human more important and of estimating the orientation of the human at the same time, by assigning human and non-human to the categories of the highest order hierarchy and by assigning angles indicating the orientations of the human to the lowest order hierarchy categories.

Second Embodiment

A learning apparatus according to a second embodiment of the present invention will be described.

Figure 9:
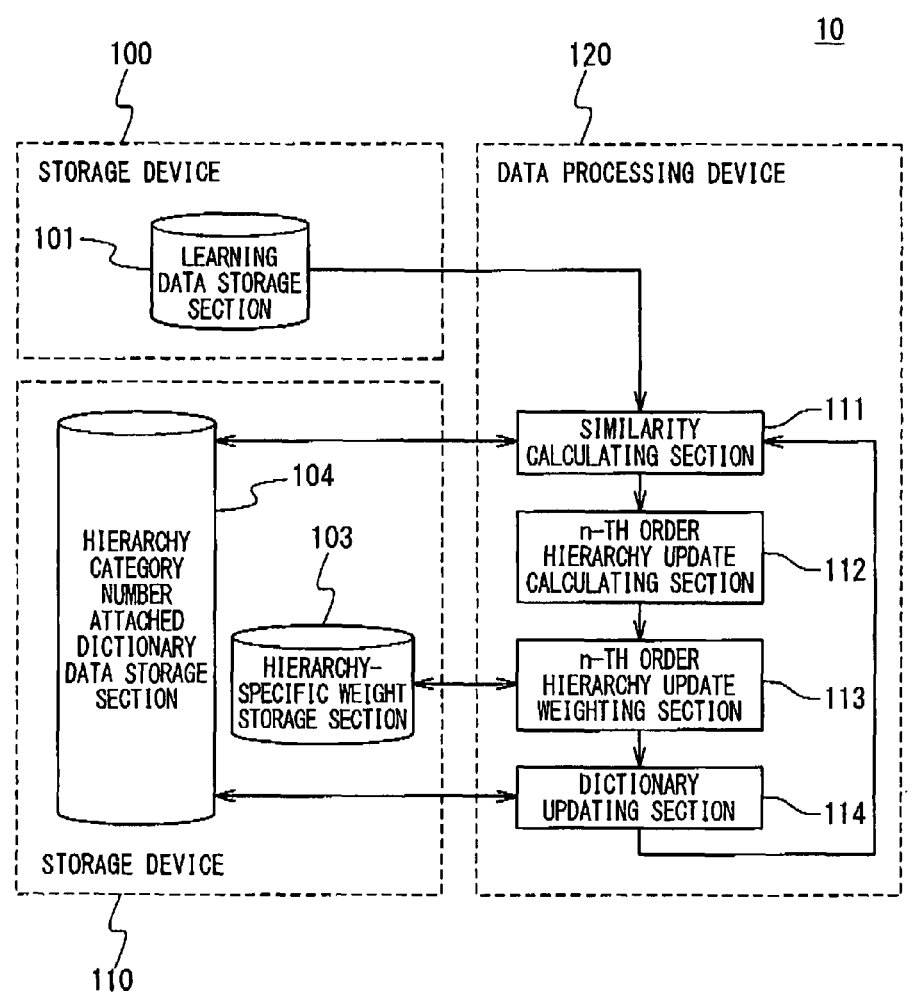
FIG. 9 is a block diagram showing a learning apparatus according to a second embodiment of the present invention.

FIG. 9 is a block diagram showing the learning apparatus according to the second embodiment of the present invention. The learning apparatus 10 according to the present embodiment is basically same as the learning apparatus 10 according to the first embodiment shown in FIG. 5. However, as compared with the learning apparatus of FIG. 5, a configuration of a dictionary data stored in a hierarchy category number attached dictionary data storage section 104 is different from that in the dictionary data storage section 102.

Figure 10:
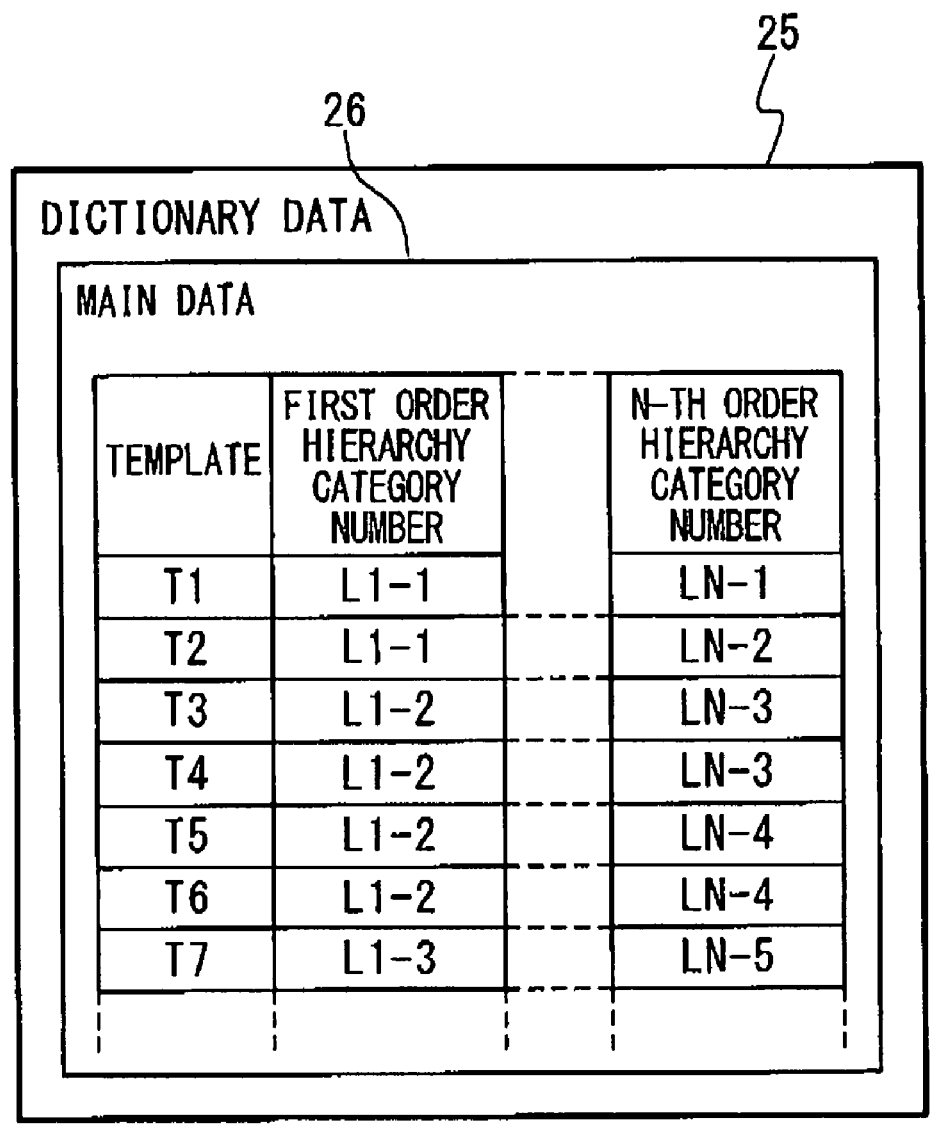
FIG. 10 shows a configuration of a dictionary data stored in a hierarchy category number attached dictionary data storage section.

FIG. 10 shows the configuration of the dictionary data stored in the hierarchy category number attached dictionary data storage section 104. The dictionary data 21 in the dictionary data storage section 102 according to the first embodiment includes the main data 22 which includes the templates and the lowest order hierarchy category numbers corresponding to those, and the hierarchy-specific category number correspondence table 23, as shown in FIG. 6. On the other hand, a dictionary data 25 in the hierarchy category number attached dictionary data storage section 104 according to the present embodiment includes only a main data 26 including data of the templates and the category numbers of all (first to N-th) order hierarchies, which correspond to the templates, as shown in FIG. 10.

According to the present embodiment, in the dictionary data 25, the category numbers of all hierarchies are directly correlated to the templates. Thus, a process to draw the correlated category number by using the table is not necessary.

Also in this case, the whole operation (a learning method according to the second embodiment) of the learning apparatus according to the second embodiment of the present invention can be executed in the same way shown in FIGS. 7 and 8.

Then, it is possible to obtain the effect equivalent to that of the first embodiment.

Third Embodiment

A learning apparatus according to a third embodiment of the present invention will be described.

Figure 11:
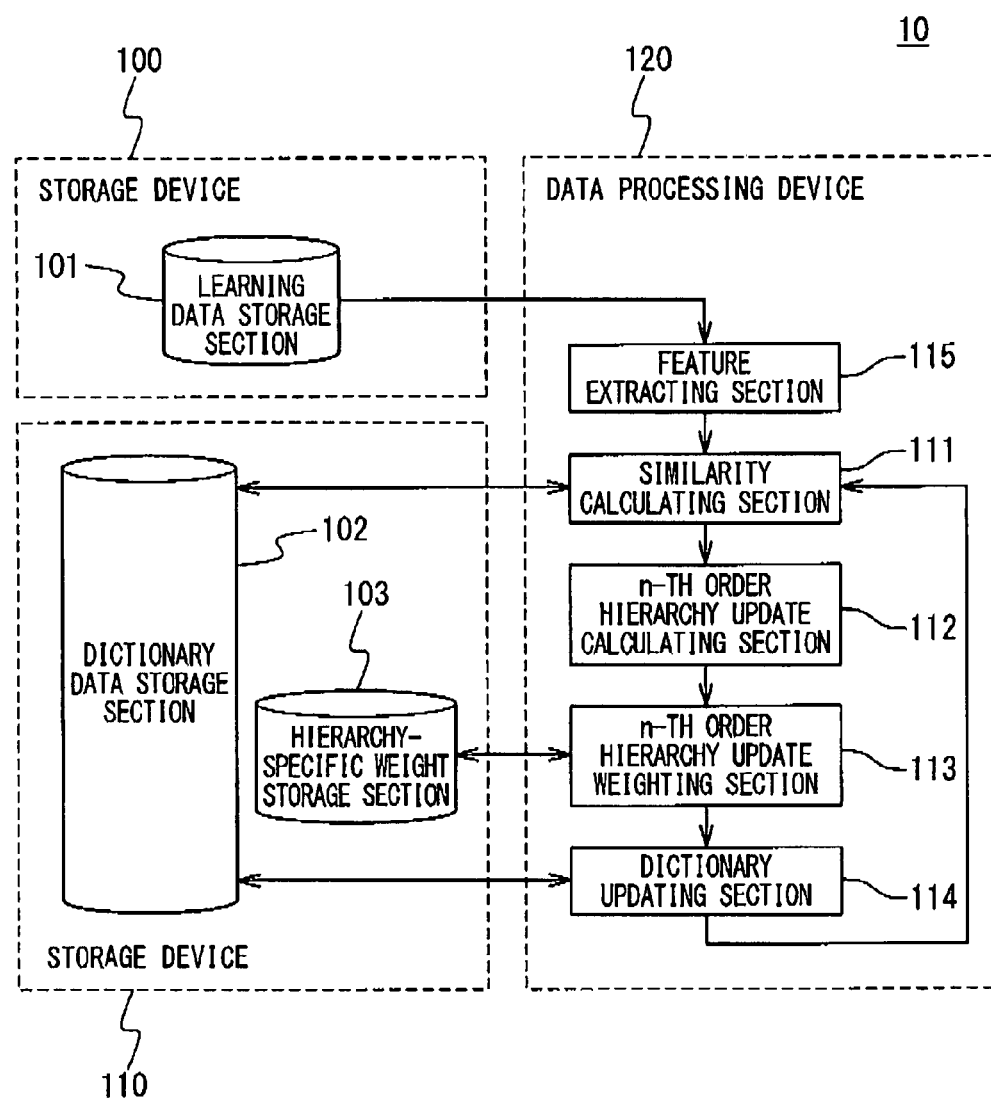
FIG. 11 is a block diagram showing a learning apparatus according to a third embodiment of the present invention.

FIG. 11 is a block diagram showing the learning apparatus according to the third embodiment of the present invention. The learning apparatus 10 according to the present embodiment is basically same as the learning apparatus 10 according to the first embodiment shown in FIG. 5. However, as compared with the learning apparatus of FIG. 5, a different point is an inclusion of a feature amount extracting section 115. However, the dictionary data storage section 102 can be replaced by the above-mentioned hierarchy category number attached dictionary data storage section 104 according to the second embodiment.

In general pattern recognitions, similarity is not directly calculated from an input pattern, but the similarity is calculated after converting the input pattern into a pattern referred to as "feature amount". This conversion is referred to as "feature conversion", "feature amount conversion" or "feature extraction".

According to the present invention, the learning sample patterns and templates are held as "feature amounts". There may be a case that the learning sample patterns stored in the learning data storage section 101 of the storage device 100 are the patterns which have not undergone the feature conversion. In this case, the feature converting section 115 is required before the process of the similarity calculating section 111. That is, according to the present embodiment, in accordance with that the learning sample patterns are the patterns which have not undergone the feature conversion, the data processing device 120 have the feature converting section 115 before having the similarity calculating section 111.

For example, a magnetic disc device can be used as the storage device 100, a personal computer can be used as the data processing device 120, and a semiconductor memory can be used as the storage device 110. However, actually, they are not limited to the above-described examples.

Next, the entire operation (a learning method according to the third embodiment) of the learning apparatus according to the third embodiment of the present invention will be described.

Figure 12:
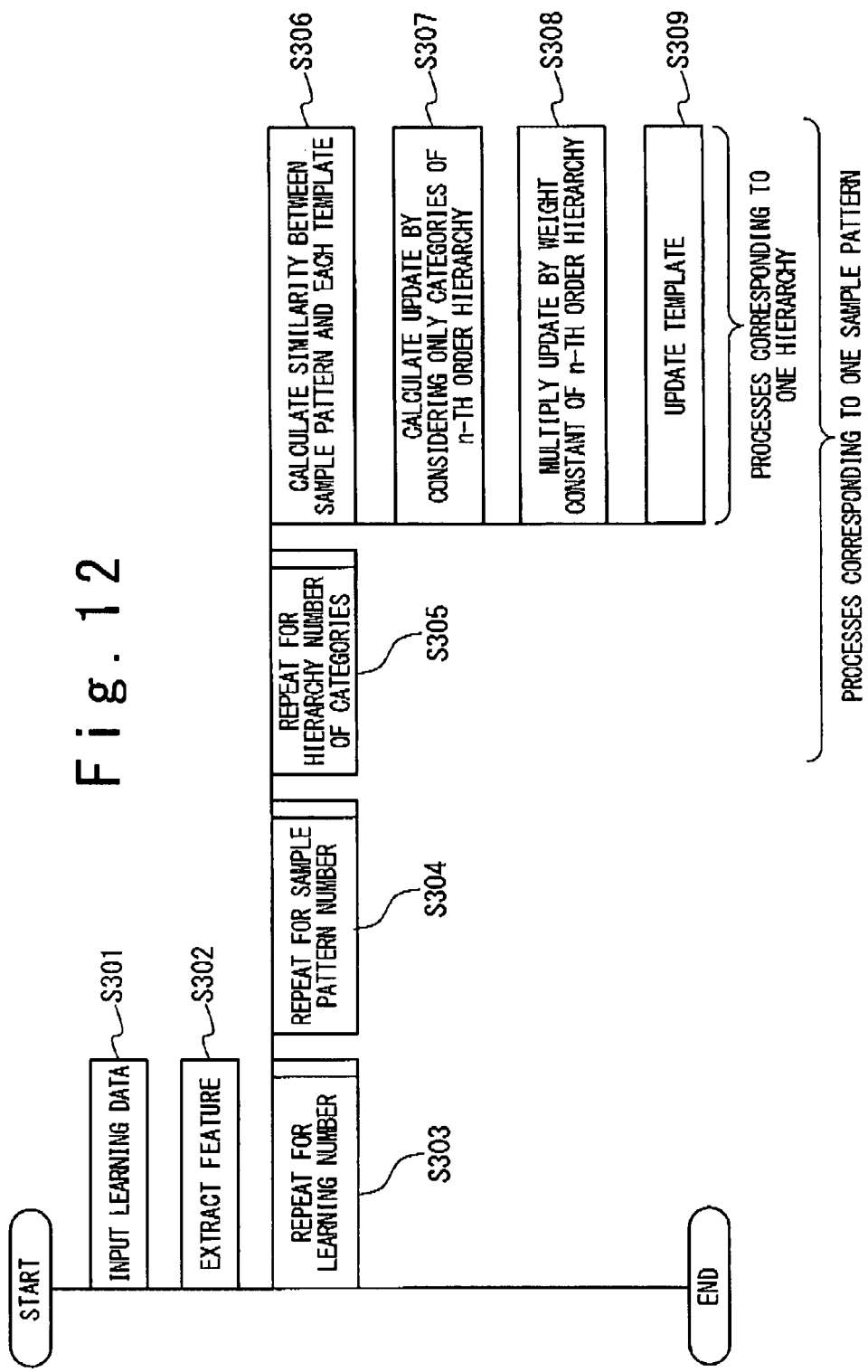
FIG. 12 is a PAD showing an entire operation of the learning apparatus according to the third embodiment of the present invention.

FIG. 12 is a PAD showing the entire operation of the learning apparatus according to the third embodiment of the present invention.

At first, the learning sample pattern and the answer category number thereof are read as learning data from the learning data storage section 101 of the storage device 100, and are inputted to the data processing device 120 (Step S301). Next, the feature extracting section 115 extracts the feature from the learning sample pattern (Step S302). As the feature extracting method in the step, any method can be used in which the extracted feature has the same format as that of the template stored in the dictionary data storage section 102. For example, the conventional art can be applied as the feature extracting method. For example, a conversion matrix is prepared in advance, and a linear conversion or anon-linear conversion is performed. Next, the feature-converted pattern and the answer category number are inputted to the similarity calculating section 111, and the templates are updated. The processes to update the templates are same as the processes of the steps S102 to S108 of FIG. 7 which shows the operation according to the first embodiment.

At first, the similarity calculating section 111 calculates the similarity between the inputted learning sample pattern and each template in the dictionary data storage section 102 (Step S306). There may be a case that the calculation of the similarity relevant to the obviously low similarity is stopped in the course of the calculation. In other words, there may be a case that the calculations of the similarities for the all templates are not executed to the finish. In the case that the calculation is stopped in the course thereof, the step S306 is not completed.

Next, the n-th order hierarchy update calculating section 112 calculates the update for the template of the answer category and the update for the template of the rival category by considering only the categories of the n-th order hierarchy (Step S307). The updates in the step 306 can be calculated by the use of the conventional method for updating templates, in which hierarchical structure of categories is not considered. The conventional method is represented by LVQ.

Next, the n-th order hierarchy update weighting section 113 multiplies the update for the answer category and the update for the rival category, which are obtained in step S307, by the weight constant in the hierarchy-specific weight storage section 103, which corresponds to the n-th order hierarchy, to provide values as new updates (Step S308). Finally, the dictionary updating section 114 updates the templates of the answer category and of the rival category based on the updates obtained in step S308 (Step 309).

The processes of the steps S306, S307, S308 and S309 as mentioned above are executed for each hierarchy of the categories. Those steps S306 to S309 are repeated for the number of the hierarchies of the categories (Step S305). Moreover, the steps S305, S306, S307, S308 and S309 are the processes that are executed for each learning sample pattern, and are repeated for the number of the learning sample patterns (Step S304). Moreover, the steps S304, S305, S306, S307, S308 and S309 are repeated for the determined number of learning (Step S303).

By the way, as for the timing of the feature extracting process, the repeated processes for updating the templates may be executed after the completion of feature extraction for all learning sample patterns in the learning data storage section 101. In another case, the feature extraction may be executed for each learning sample pattern one by one in the first repetition of the repeated processes for updating the templates. When the feature extraction is executed for each learning sample pattern one by one, the input of the learning pattern of the step S301 and the feature extraction of the step S302 are executed between steps S303 and S304. In this case, the step S301 and step S302 may be executed only in the first repetition of the repeated step S303.

Figure 13:
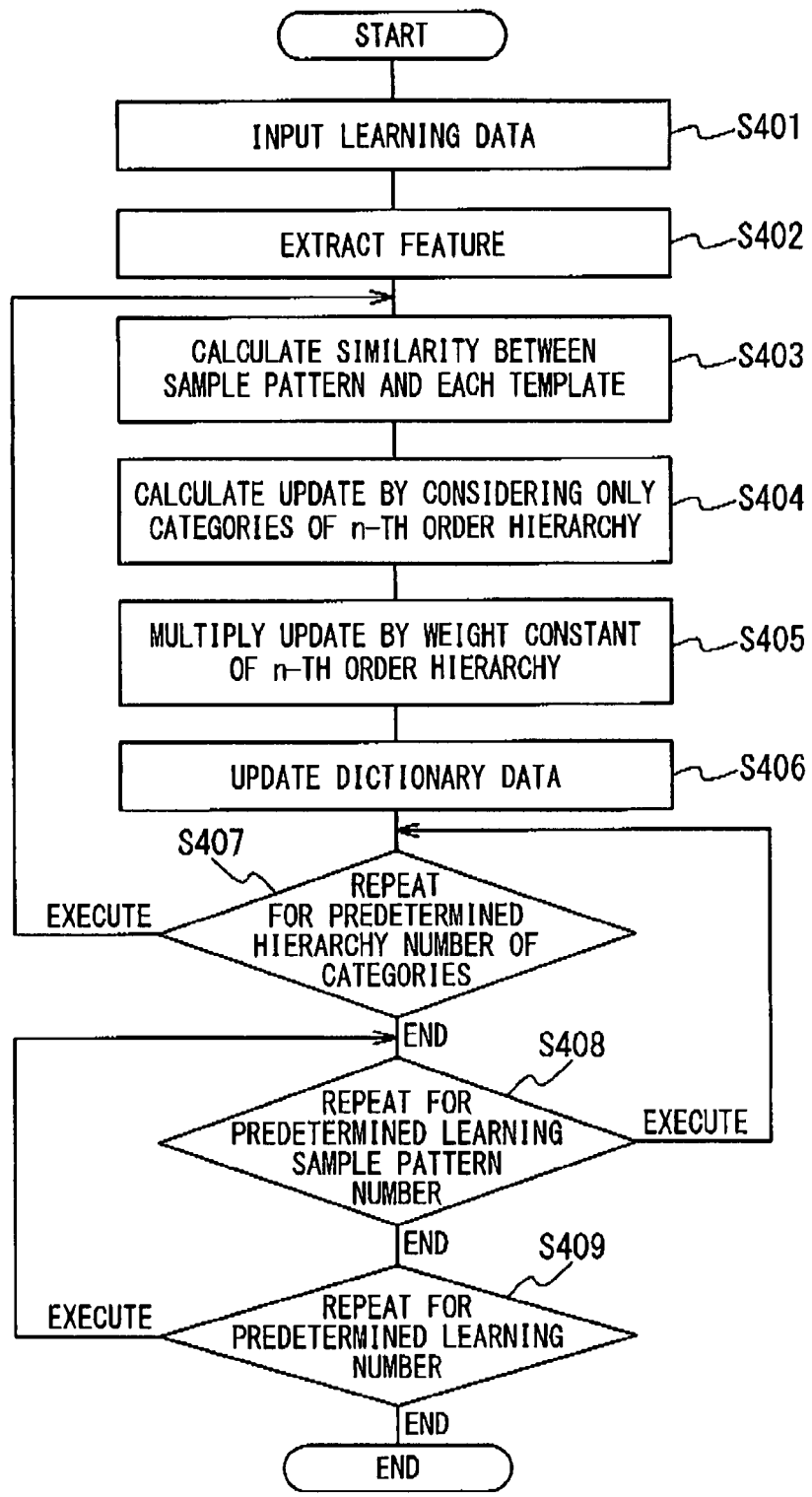
FIG. 13 is a flowchart showing the entire operation of the learning apparatus according to the third embodiment of the present invention.

FIG. 13 is a flowchart showing the entire operation (the learning method according to the third embodiment) of the learning apparatus according to the third embodiment of the present invention. In the figure, the flow chart (PAD) of FIG. 12 is represented as a flowchart.

The relation between FIG. 13 and FIG. 12 will be described. Steps S401 and S402 in FIG. 13 correspond to the steps S301 and S302 in FIG. 12. Steps S403 to S406 correspond to the steps S306 to 5309, respectively. Moreover, a step S407 that is a judging process for the repetition corresponds to the step S305, a step S408 corresponds to the step S304, and a step S409 corresponds to the step S303, respectively. The details of the operation are the same as shown in FIG. 12.

The entire operation according to the present embodiment shown in the flow chart of FIG. 13 is the same as shown in FIG. 8, except that there is the feature amount extraction s402.

Next, an exemplary embodiment of the third embodiment will be described with reference to the drawings.

Figure 14:
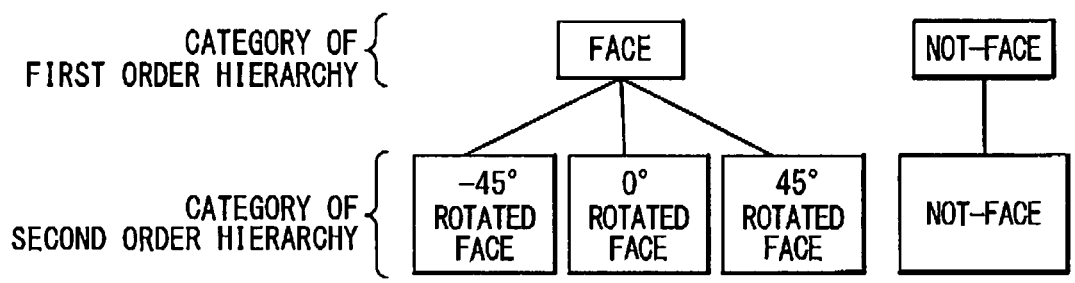
FIG. 14 is a tree diagram showing hierarchical categories relevant to the learning apparatus according to an exemplary embodiment of the third embodiment of the present invention.

FIG. 14 is a tree diagram showing the hierarchical categories relevant to the learning apparatus according to the exemplary embodiment of the third embodiment of the present invention. As for the exemplary embodiment, a pattern to be identified is an image and the categories of hierarchical structure have two hierarchies. The categories of the first hierarchy are "face" and "not-face".

The categories of the second hierarchy are not-face and three kinds of the face ("(−45°)-rotated face", "0°-rotated face" and "45°-rotated face") in which the rotation angles of the face are different. In the identification by using the templates prepared by the learning according to the present exemplary embodiment, an inputted image pattern can be identified as face or not-face, and then, when it is identified as face, the rotation angle can also be identified at the same time.

FIG. 15 shows one example of the dictionary data stored in the dictionary data storage section 102. Here, in accordance with the classification of categories shown in FIG. 14, templates T1 and T2 shown in FIG. 15 correspond to the not-face and templates T3 to T8 correspond to the face. As for the rotation angle of the face, the templates T3 and T4 shown in FIG. 15 correspond to 0° ("0°-rotated face"), the templates T5 and T6 correspond to 45° ("45°-rotated face"), and the templates T7 and T8 correspond to −45° ("(−45°)-rotated face").

Although the templates T1 to T8 in FIG. 15 are represented as images, the actual templates are not images themselves but data prepared by the feature extraction. In the dictionary data, each template and the category numbers of the categories to which the template belongs are correlated. The categories to which the template belongs are the category of the first order hierarchy and the category of the second order hierarchy. The weight value for the first hierarchy is 1.0 and the weight value for the second hierarchy is 0.5. The weight values are stored as data in the hierarchy-specific weight storage section 103.

The initial templates as the templates before the start of the learning are prepared in advance by applying the K-means method to the learning sample patterns belonging to each category of the second hierarchy. At first, one of the learning sample patterns is read from the learning data storage section 101 in the storage device 100 (Step S401). Explanations will be given for the case that the learning sample pattern is the face having the rotation angle of 0° as shown in FIG. 16. FIG. 16 shows one example of the learning sample pattern read from the learning data storage section 101. The feature extracting section 115 performs the feature extraction calculation on the read learning sample pattern (Step S402). An example of the feature extraction process will be described. At first, a pixel included in each small region of the pattern is read from the learning data storage section 101 one by one, an orientation component is assigned to the pixel representing each small region and an orientation pattern is prepared which indicates the distribution of the orientation components on the pattern. The orientation pattern is read, and an orientation feature pattern for the feature extraction is obtained by integrating the orientation components of the different regions. However, actually, the invention is not limited to the above-described example. The conventional art can be used as the feature extraction process.

Next, the similarity calculating section 111 calculates the similarity between the pattern obtained as the result of the feature extraction and each of the templates T1 to T8 (Step S403). As a result, the similarities are obtained as values shown in FIG. 17. FIG. 17 shows one example of the relation between the dictionary data and the learning sample pattern.

Next, the n-th order hierarchy update calculating section 112 calculates the updates based on the first hierarchy (Step S404). The Generalized LVQ method is used for calculating the updates. In the Generalized LVQ method, as for FIG. 17, the updates are calculated for making the template T6 of the highest similarity among the templates belonging to the same category as the answer category (first hierarchy in FIG. 16: "2") of the learning sample pattern close to the learning sample pattern, and for making the template T2 of the highest similarity among the templates belonging to other category (first hierarchy: "1") of the same hierarchy as the answer category away from the learning sample pattern.

Next, the n-th order hierarchy weighting section 113 reads the weight of the first order hierarchy from the semiconductor memory (the hierarchy-specific weight storage section 103), multiplies the updates by the weight and newly defines the products as the updates (Step S405). The dictionary updating section 114 updates the templates of the dictionary data by using the new update (Step S406). The operation returns to the step S403, since the second hierarchy of the categories remains among the hierarchies of the categories (Step s407).

Next, a similarity between the pattern obtained as the result of the feature extraction and each of the templates T1 to T8 updated based on the first hierarchy is calculated (Step S403). As a result, the similarities are obtained as values shown in FIG. 18. FIG. 18 shows one example of the relation between the dictionary data and the learning sample pattern.

Next, the n-th order hierarchy update calculating section 112 calculates the updates based on the second hierarchy by using the Generalized LVQ (Step S404). In that calculation, as for FIG. 18, the updates are calculated for making the template T4 of the highest similarity among the templates belonging to the same category as the answer category (second hierarchy in FIG. 16: "2") of the learning sample pattern close to the learning sample pattern, and for making the template T6 of the highest similarity among the templates belonging to other category (second hierarchy: any one of "1", "3" and "4") of the same hierarchy as the answer category away from the learning sample pattern.

Next, the n-th order hierarchy weighting section 113 reads the weight of the second hierarchy from the semiconductor memory (the hierarchy-specific weight storage section 103), multiplies the updates by the weight and newly defines the products as the updates (Step S405). The dictionary updating section 114 uses the new updates to update the templates of the dictionary data (Step S406). The operation proceeds to the step s408, since the all hierarchies of the categories are finished (Step s407).

Next, the second learning sample pattern is read from the learning data storage section 101 in the storage device 100, and the templates are updated in the same way as the first learning sample pattern. Then, as for the third or later learning sample patterns, the templates are updated in the same way.

This is repeated for the number of the learning sample patterns (Step S408). Then, such update of the templates is repeated for the predetermined number of 100 (Step S409). Consequently, the dictionary data in the semiconductor memory becomes the dictionary data which has undergone the learning according to the present invention.

Figure 19:
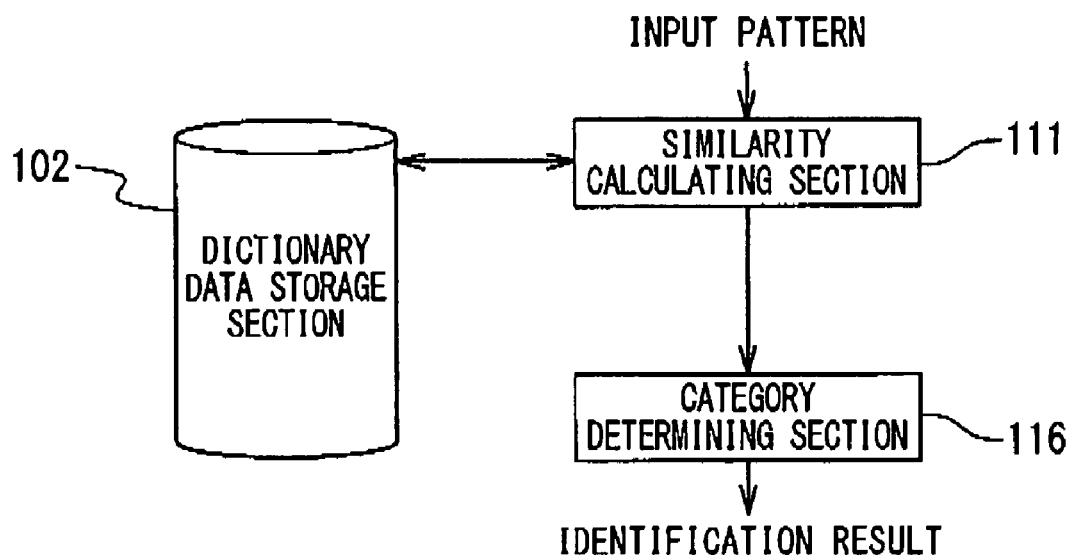
FIG. 19 is a block diagram showing an identifying apparatus according to the embodiments of the present invention.

FIG. 19 is a block diagram showing an identifying apparatus according to the embodiments of the present invention.

Figure 4:
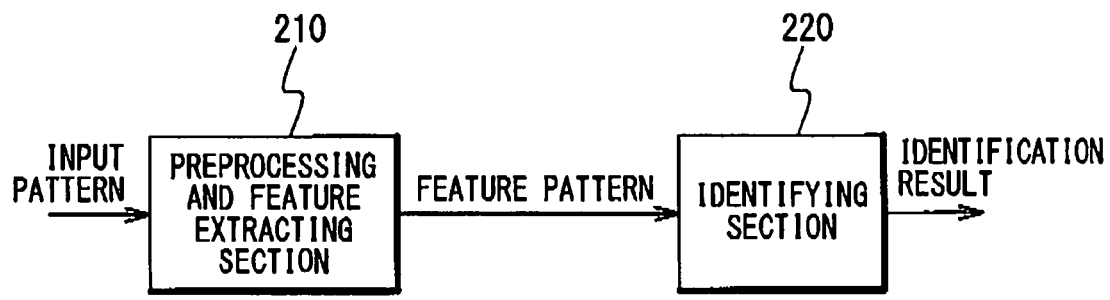
FIG. 4 is a block diagram of a typical system for identifying patterns.

The identifying apparatus 20 includes a dictionary data storage section 102, the similarity calculating section 111 and a category determining section 116. This identifying apparatus 20 corresponds to the identifying section 220 shown in FIG. 4.

The dictionary data storage section 102 and the similarity calculating section 111 are same as those according to each of the above-mentioned embodiments. The dictionary data storage section 102 may be implemented as the hierarchy category number attached dictionary data storage section 104.

The similarity calculating section 111 receives the input pattern. The input pattern is the pattern which has undergone the feature conversion.

The category determining section 116 calculates the similarities and then classifies the input pattern to the category to which the template of high similarity belongs. For example, the category determining section 116 classifies the input pattern into the category to which the template of the highest similarity belongs. Also, the category determining section 116 can determine the category by carrying out the majority operation with regard to the categories to which templates of high similarity belong. By the way, actually, the data processing device 120 may include the category determining section 116. For example, it is possible that the storage device 110 includes the dictionary data storage section 102, that the data processing device 120 includes the similarity calculating section 111 and category determining section 116, and that the above-mentioned learning apparatus includes the identifying apparatus 20 consequently.

The operation of the identifying apparatus 20 is as follows. That is, the pattern to be identified is inputted as the input pattern to the similarity calculating section 111. The similarity calculating section 111 refers to each template held in the dictionary data storage section 102 and calculates the similarity between the pattern to be identified and each template. The category determining section 116 classifies the pattern to be identified into the category to which the template of high similarity belongs.

By the way, as for the identifying apparatus 20, the learning apparatus which is described in each of the above embodiments execute the learning to prepare each template in the dictionary data storage section 102. Thus, the dictionary data storage section 102 in which the templates are stored can be shared by the learning apparatus 10 and the identifying apparatus 20. Also, the similarity calculating section 111 on which the same process is performed for the learning apparatus 10 and the identifying apparatus 20 may be shared.

Figure 20:
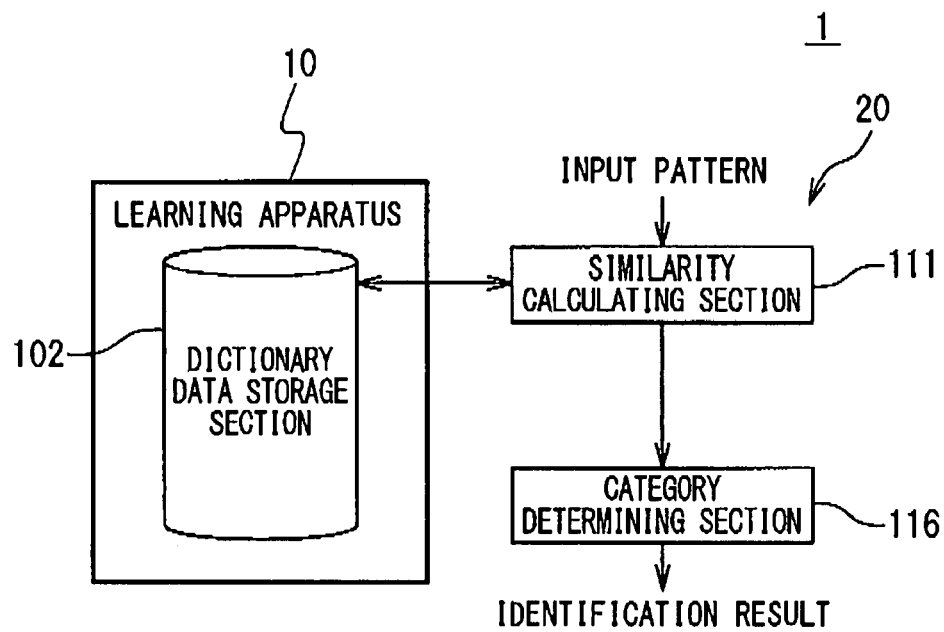
FIG. 20 is a block diagram showing an example of configuration of a data learning system for identifying according to the embodiments of the present invention.
Figure 21:
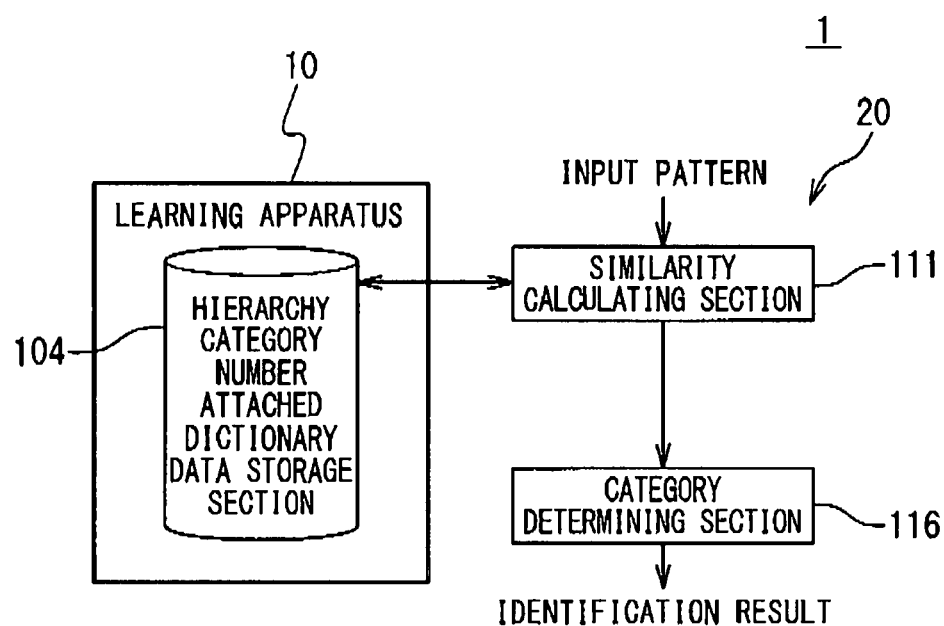
FIG. 21 is a block diagram showing another example of configuration of the data learning system for identifying according to the embodiments of the present invention.

In this way, the data learning system for identifying according to the present invention can be provided by combining the learning apparatus 10 and the identifying apparatus 20. FIG. 20 and FIG. 21 are block diagrams showing examples of the data learning system for identifying according to the embodiments of the present invention. Those show the examples that the dictionary data storage section 102 and hierarchy category number attached dictionary data storage section 104 are shared by the learning apparatus 10 and identifying apparatus 20.

The data learning system for identifying includes the learning apparatus 10 and the identifying apparatus 20. Then, in the data learning system for identifying, the dictionary data storage section 102 (or the hierarchy category number attached dictionary data storage section 104) stores the templates updated by the learning apparatus 10 and the identifying apparatus 20 reads the updated templates from the dictionary data storage section 102 (or the hierarchy category number attached dictionary data storage section 104) to use them for the identification.

Features of the present invention will be described in detail.

The learning data storage section 101 holds the learning sample patterns and their answer category numbers of the categories of the hierarchies from the highest order hierarchy to the lowest order hierarchy.

The dictionary data storage section 102 holds the templates and the answer category numbers of the categories of the hierarchies from the highest order hierarchy to the lowest order hierarchy. The answer category numbers corresponds to the templates.

The similarity calculating section 111 calculates the similarity between the inputted learning pattern and the templates.

The n-th order hierarchy update calculating section 112 calculates: the update which is added to the template belonging to the answer category in certain hierarchy (n-th order hierarchy) to increase the similarity of the template; and the update which is added to the template belonging to the rival category in the n-th order hierarchy to reduce the similarity of the template.

The n-th order hierarchy weighting section 113 multiplies the updates by certain constant corresponding to the n-th order hierarchy.

The dictionary updating section 114 updates the template of the right answer category and the template of the rival category, based on the updates.

With regard to the learning data stored in the learning data storage section 101 and the dictionary data stored in the dictionary data storage section 102, the processes of respective sections from the similarity calculating section 111 to the dictionary updating section 114 are repeatedly executed for all of the hierarchies. Moreover, the repeated execution is repeatedly executed for the number of the learning sample patterns. Moreover, the repeated execution of the repeated execution is repeated for the determined number of learning, and thus the dictionary data is prepared by the learning. In detail, the learning method according to the present invention identifies the categories having hierarchical structure but the templates included in the dictionary data do not have hierarchical structure. The templates correspond only to the categories of the lowest order hierarchy of hierarchical structure.

An object of the present invention is accomplished by employing such configuration, by not having templates of the categories of any hierarchy different from the lowest order hierarchy, and by multiplying, as for all hierarchies, the update by the weight corresponding to the hierarchy for updating the template.

The "dictionary" to be used for the identification is obtained by embodying the present invention. There is a case that the identifying apparatus 20 refers to the "dictionary". The "dictionary" includes the plurality of templates. The identifying apparatus 20 finds the template having the highest similarity to the inputted pattern and outputs a category name of the template as the identification result. Thus, the actual "dictionary" can be said to include the plurality of "sets of the template and the categories thereof". The number of the templates corresponding to one category is arbitrary.

By the way, the dictionary which has not undergone the learning may be any data as long as the data structure is satisfied. The data is only required to include "sets of randomly prepared template and categories". As for the initial state, the data including the above sets of the randomly prepared template and categories may be prepared as a dummy data.

Examples of the hardware configuration to embody the present invention will be described.

When a PC (personal computer) or a workstation is used, as a first example, the PC may be used as the entire learning apparatus, the semiconductor memory may be used as the learning data storage section 101, the dictionary data storage section 102 and the hierarchy-specific weight storage section 103, and the CPU may be used as the data processing device 120. As a second example, since there is the great quantity of the learning data, it is effective that only the learning data storage section is implemented as the magnetic disc and that the dictionary data storage section 102 and the hierarchy-specific weight storage section 103 are implemented as the semiconductor memory. As a third example, since the similarity calculating section 111 is the heaviest process, only the calculations of the similarity calculating section 111 may be distributed among a plurality of PCs.

Also, an apparatus other than PC, which includes a memory device and data processing device, may be used. For example, the present invention can be implemented as consumer electronics such as digital television, DVD recorder and car navigation system.

As for an exemplary embodiment relevant to a client server type, the learning process may be executed by the server side to the learning data received from the client side, and the resultant dictionary data may be returned to the client side. Also, a synchronous process for the dictionary data may be executed between the client and the server. By the way, the communication network between the client and the server may be wired or wireless.

For example, a portable cellular phone equipped with the identifying apparatus 20 executes an automatic identification. In the case that the portable cellular phone fails in the identification or is suspected to fail in the identification, the learning data is send by wireless transmission from the portable cellular phone to the learning data storage section 101 and recorded additionally. The dictionary data as the result of the learning is returned by wireless communication from the dictionary data storage section 102 to the portable cellular phone. Other than the portable cellular phone, a PHS (Personal Handy-phone System) and PDA (Personal Digital Assistance) may be used.

The present invention can be applied to the use such as apparatus and computer program which can detect a face from a static image or dynamic image and identify the orientation of the face at the same time by using the learning image patterns of the face, not-face and the face of different orientation for the learning.

The present invention can be applied to the use such as rapid identification of character, when the patterns of characters are used for the learning and similar characters are belongs to the same category.

Moreover, the present invention can be applied to the use in which voice sound and speaker are identified, when the patterns of voice sounds are used for the learning. The present invention can be applied to the use in which genre and title of music are identified, when the patterns of music are used for the learning.

The present invention can be applied to the use such as detection of virus from a file in a memory, weeding spam mail and detection of attack to a server, when the patterns of computer virus, spam mail and content of communication in attack to a server is used for the learning and high order categories are set adequately.

Moreover, the present invention can be applied to the use in which entire sales and sale of each product in the future are predicted, when the patterns of sales of products in the past are used for the learning.

The present invention enables rapid detection of generically modified crop, identification of a gene responsible for a disease and DNA identification, when the patterns of gene information are used for the learning and high order categories are set adequately.

As for a first effect, the size of the dictionary for the identification can be small. Since the number of templates can be suppressed to a small number by realizing the identification of hierarchical categories based on the templates which do not have hierarchical structure.

As for a second effect, the templates are prepared which can enhance the performance of the identification of categories of hierarchy other than the lowest order hierarchy. Since the performance of the identification with respect to arbitral hierarchy can be adjusted to a high level by multiplying, as for all hierarchies, the updates by the weight corresponding to the hierarchy for updating the template.

It is apparent that the present invention is not limited to the above embodiments and that each of the embodiments may be modified and changed within the scope of the present invention.

The invention claimed is:

1. A system comprising:
   a data storage section configured to hold a first pattern and templates each of which belongs to members of a set of categories, wherein each of said categories corresponds to one of hierarchies of a hierarchical structure;
   a similarity calculating section configured to calculate first similarities between said first pattern and said templates;
   an update calculating section configured to calculate a first update based on said first similarities;
   a weighting section configured to multiply said first update by one of weight constants to provide a second update, wherein said weight constants correspond to said hierarchies, respectively;
   an updating section configured to update said templates based on said second update; and
   a category determining section,
   wherein said similarity calculating section is further configured to calculate second similarities between a second pattern and said updated templates, and
   said category determining section is configured to classify said second pattern into one of said categories based on said second similarities.

2. The system according to claim 1, further comprising:
   a feature extracting section configured to convert said first pattern and said second pattern into feature patterns and to send said feature patterns to said similarity calculating section.

3. A learning apparatus, comprising;
   a data storage section configured to hold a pattern and templates each of which belongs to members of a set of categories, wherein each of said categories corresponds to one of hierarchies of a hierarchical structure;
   a similarity calculating section configured to calculate similarities between said pattern and said templates;
   an update calculating section configured to calculate a first update based on said similarities;
   a weighting section configured to multiply said first update by one of weight constants to provide a second update, wherein said weight constants correspond to said hierarchies, respectively; and
   an updating section configured to update said templates based on said second update.

4. The learning apparatus according to claim 3, wherein said data storage section is further configured to hold a main data in which each of said templates is correlated to one of said members, and
   said one of said members corresponds to a first hierarchy of said hierarchies.

5. The learning apparatus according to claim 4, wherein said data storage section is further configured to hold a correspondence table in which said one of said members is correlated to another of said members,
   said another of said members corresponds to a second hierarchy of said hierarchies, and
   said second hierarchy is other than said first hierarchy.

6. The learning apparatus according to claim 3, wherein said data storage section is further configured to hold a main data in which each of said templates is correlated to each of said members.

7. The learning apparatus according to claim 3, further comprising:
   a feature extracting section configured to convert said pattern into feature pattern and to send said feature pattern to said similarity calculating section.

8. A learning apparatus comprising:
   a similarity calculating section configured to calculate similarities between a pattern and templates each of which belongs to members of a set of categories, wherein each of said categories corresponds to one of hierarchies of a hierarchical structure;
   an update calculating section configured to calculate a first update based on said similarities;
   a weighting section configured to multiply said first update by one of weight constants to provide a second update, wherein said weight constants correspond to said hierarchies, respectively; and
   an updating section configured to update said templates based on said second update.

9. The learning apparatus according to claim 8, further comprising:
   a feature extracting section configured to convert said pattern into feature pattern and to send said feature pattern to said similarity calculating section.

10. An identifying apparatus comprising:
    a dictionary data storage section configured to hold updated templates prepared by a learning apparatus;
    an identifying apparatus similarity calculating section; and
    a category determining section,
    wherein said learning apparatus comprises:
    a learning data storage section configured to hold a learning pattern and templates each of which belongs to members of a set of categories, wherein each of said categories corresponds to one of hierarchies of a hierarchical structure;
    a learning apparatus similarity calculating section configured to calculate first similarities between said learning pattern and said templates;
    an update calculating section configured to calculate a first update based on said first similarities;
    a weighting section configured to multiply said first update by one of weight constants to provide a second update; and
    an updating section configured to update said templates based on said second update to provide said updated template,
    said weight constants correspond to said hierarchies, respectively,
    said identifying apparatus similarity calculating section is configured to calculate second similarities between an input pattern and said updated templates, and
    said category determining section is configured to classify said input pattern into one of said categories based on said second similarities.

11. The identifying apparatus according to claim 10, wherein a similarity between one of said updated templates and said input pattern is highest among said second similarities,
    said one of said updated templates belongs to said one of said categories.

12. An identifying apparatus comprising:
    a dictionary data storage section configured to hold updated templates prepared by a learning apparatus;
    an identifying apparatus similarity calculating section; and
    a category determining section,
    wherein said learning apparatus comprises:
    a learning apparatus similarity calculating section configured to calculate first similarities between a learning pattern and templates each of which belongs to members of a set of categories, wherein each of said categories corresponds to one of hierarchies of a hierarchical structure;
    an update calculating section configured to calculate a first update based on said first similarities;
    a weighting section configured to multiply said first update by one of weight constants to provide a second update; and
    an updating section configured to update said templates based on said second update to provide said updated template,
    said weight constants correspond to said hierarchies, respectively,
    said identifying apparatus similarity calculating section is configured to calculate second similarities between an input pattern and said updated templates, and
    said category determining section is configured to classify said input pattern into one of said categories based on said second similarities.

13. The identifying apparatus according to claim 12, wherein a similarity between one of said updated templates and said input pattern is highest among said second similarities,
    said one of said updated templates belongs to said one of said categories.

14. A learning method comprising:
    calculating a similarity between one of patterns and each of templates, wherein each of said patterns and said templates belongs to members of a set of categories, and said categories correspond to hierarchies of a hierarchical structure;
    calculating an update based on said similarity by considering one of said hierarchies;
    weighting said update by using a weight constant corresponding to said one of said hierarchies; and
    updating said templates based on said weighted update.

15. The learning method according to claim 14, wherein said calculating said similarity, said calculating said update, said weighting and said updating are executed for each of said hierarchies.

16. The learning method according to claim 15, wherein said execution of said calculating said similarity, said calculating said update, said weighting and said updating is executed for each of said patterns.

17. The learning method according to claim 16, wherein said execution of said execution of said calculating said similarity, said calculating said update, said weighting and said updating is repeated for predetermined number.

18. A learning method comprising:
    calculating similarities between a first pattern and templates each of which belongs to members of a set of categories, wherein each of said categories corresponds to one of hierarchies of a hierarchical structure;
    calculating an update based on said similarities;
    weighting said update by using one of weight constants, wherein said weight constants correspond to said hierarchies, respectively; and
    updating said templates based on said weighted update.

19. The learning method according to claim 18, further comprising:
converting a second pattern into said first pattern by feature extraction.

20. The learning method according to claim 18, wherein in said calculating said similarities, a main data is referred in which each of said templates is correlated to a one of said members, and
said one of said members corresponds to a first hierarchy of said hierarchies.

21. The learning method according to claim 20, wherein in said calculating said similarities, a correspondence table is referred in which said one of said members is correlated to another of said members,
said another of said members corresponds to a second hierarchy of said hierarchies, and
said second hierarchy is other than said first hierarchy.

22. The learning method according to claim 18, wherein in said calculating said similarities, a main data is referred in which each of said templates is correlated to each of said members.

23. An identifying method comprising:
calculating a first similarity between one of patterns and each of templates, wherein each of said patterns and said templates belongs to members of a set of categories, and said categories correspond to hierarchies of a hierarchical structure;
calculating an update based on said first similarity by considering one of said hierarchies;
weighting said update by using a weight constant corresponding to said one of said hierarchies;
updating said templates based on said weighted update;
calculating similarities between an input pattern and said updated templates; and
classifying said input pattern into one of said categories based on said similarities.

24. The identifying method according to claim 23, wherein a second similarity between one of said updated templates and said input pattern is highest among said similarities,
said one of said updated templates belongs to said one of said categories.

25. An identifying method comprising:
calculating first similarities between a pattern and templates each of which belongs to members of a set of categories, wherein each of said categories corresponds to one of hierarchies of a hierarchical structure;
calculating an update based on said first similarities;
weighting said update by using one of weight constants, wherein said weight constants correspond to said hierarchies, respectively;
updating said templates based on said weighted update;
calculating second similarities between an input pattern and said updated templates; and
classifying said input pattern into one of said categories based on said second similarities.

26. The identifying method according to claim 25, wherein a similarity between one of said updated templates and said input pattern is highest among said a second similarities,
said one of said updated templates belongs to said one of said categories.

27. A computer program product for a method which comprises:
calculating a similarity between one of patterns and each of templates, wherein each of said patterns and said templates belongs to members of a set of categories, and said categories correspond to hierarchies of a hierarchical structure;
calculating an update based on said similarity by considering one of said hierarchies;
weighting said update by using a weight constant corresponding to said one of said hierarchies; and
updating said templates based on said weighted update.

28. A computer program product for a method which comprises:
calculating similarities between a pattern and templates each of which belongs to members of a set of categories, wherein each of said categories corresponds to one of hierarchies of a hierarchical structure;
calculating an update based on said similarities;
weighting said update by using one of weight constants, wherein said weight constants correspond to said hierarchies, respectively; and
updating said templates based on said weighted update.

29. A computer program product for a method which comprises:
calculating a similarity between one of patterns and each of templates, wherein each of said patterns and said templates belongs to members of a set of categories, and said categories correspond to hierarchies of a hierarchical structure;
calculating an update based on said similarity by considering one of said hierarchies;
weighting said update by using a weight constant corresponding to said one of said hierarchies;
updating said templates based on said weighted update;
calculating similarities between an input pattern and said updated templates; and
classifying said input pattern into one of said categories based on said similarities.

30. A computer program product for a method which comprises:
calculating first similarities between a pattern and templates each of which belongs to members of a set of categories, wherein each of said categories corresponds to one of hierarchies of a hierarchical structure;
calculating an update based on said first similarities;
weighting said update by using one of weight constants, wherein said weight constants correspond to said hierarchies, respectively;
updating said templates based on said weighted update;
calculating second similarities between an input pattern and said updated templates; and
classifying said input pattern into one of said categories based on said second similarities.

31. A computer readable recording media which records a dictionary data including:
a main data in which each of templates is correlated to a first category corresponding to a first hierarchy of a hierarchical structure; and
a correspondence table in which said first category is correlated to a second category corresponding to a second hierarchy of said hierarchical structure,
wherein said second hierarchy is other than said first hierarchy.

32. A computer readable recording media which records a dictionary data including:
a main data in which each of templates is correlated to a category corresponding to each hierarchy of a hierarchical structure.

* * * * *